US007774432B2

(12) United States Patent
Cartmell et al.

(10) Patent No.: US 7,774,432 B2
(45) Date of Patent: Aug. 10, 2010

(54) REGISTERING AND USING MULTILINGUAL DOMAIN NAMES

(75) Inventors: Brian Cartmell, Seattle, WA (US); Jothan Frakes, Normandy Park, WA (US)

(73) Assignee: VeriSign, Inc., Mountain View, CA (US)

( * ) Notice: Subject to any disclaimer, the term of this patent is extended or adjusted under 35 U.S.C. 154(b) by 0 days.

(21) Appl. No.: 11/654,641

(22) Filed: Jan. 18, 2007

(65) Prior Publication Data

US 2007/0118620 A1    May 24, 2007

Related U.S. Application Data

(63) Continuation of application No. 09/974,746, filed on Oct. 9, 2001, now abandoned.

(60) Provisional application No. 60/239,170, filed on Oct. 9, 2000.

(51) Int. Cl.
*G06F 15/16* (2006.01)
(52) U.S. Cl. ........................................ 709/219
(58) Field of Classification Search ......... 709/217–219; 707/1–10; 704/1–10
See application file for complete search history.

(56) References Cited

U.S. PATENT DOCUMENTS

| | | | |
|---|---|---|---|
| 5,337,233 A | 8/1994 | Hofert et al. | |
| 6,009,422 A * | 12/1999 | Ciccarelli | 707/4 |
| 6,182,148 B1 | 1/2001 | Tout | |
| 6,314,469 B1 | 11/2001 | Tan et al. | |
| 6,370,581 B2 * | 4/2002 | Rader | 709/230 |
| 6,636,853 B1 * | 10/2003 | Stephens, Jr. | 707/10 |
| 6,901,436 B1 * | 5/2005 | Schneider | 709/219 |
| 7,020,602 B1 * | 3/2006 | Kim et al. | 704/8 |
| 2001/0044852 A1 * | 11/2001 | Rader | 709/236 |

FOREIGN PATENT DOCUMENTS

WO    WO 99-19814    4/1999

OTHER PUBLICATIONS

International Search Report, PCT/US01/3162, Jan. 25, 2002, 3 pages.
Network Solutions Hosts First Annual Analyst Conference, Business Wire, Nov. 11, 1999, 2 pages.

(Continued)

*Primary Examiner*—Benjamin R Bruckart
(74) *Attorney, Agent, or Firm*—Townsend and Townsend and Crew LLP

(57) ABSTRACT

A method, system, and computer-readable medium are described for registering and using multilingual domain names that include characters outside the ASCII character subset supported by the DNS system. Such multilingual domain names can in some situations be registered by first being converted into appropriate ASCII-Compatible Encodings (ACEs) that represent the corresponding multilingual domain names and that use only characters within the ASCII character subset. In addition, a variety of binary variants may be generated at registration for each multilingual domain name and then used as equivalents for the multilingual domain name, such as by storing the variants in the registry as alternative domain names or by otherwise reserving the binary variants. When requests to resolve such a registered multilingual domain name into a corresponding IP address or URL are received, the stored binary variants and/or ACE information can then be used to respond in an appropriate manner.

41 Claims, 22 Drawing Sheets

OTHER PUBLICATIONS

"World-Wide Web truly a domain for all languages," South China Morning Post, Dec. 21, 1999, 2pages.

Phoon, Michelle, "Hong Kong Registrars Offer Chinese Domain Names,"Newsbytes, NA, Jan. 17, 2000, 2 pages.

Taylor, Neil, "Chinese Domain Name Market Fuels Confusion," Newsbytes, NA, Feb. 8, 2000, 4 pages.

Creed, Adam, "INWW to Offer Chinese-Language Domain Names,"Newsbytes, NA, Jul. 6, 2000, 2 pages.

"Network Solutions Registry Opens Multilingual Domain Name Testbed to Registrars, Non-English Character Standards to Extend the Internet Domain Name System," The Network Solutions Registry, Aug. 24, 2000 2pages http://www.nsol.com/news/2000/pr_20000824.html [Accessed Oct. 10, 200].

"How dose this all work?" Network Solutions, Inc., Oct. 3, 2000, 3 pages http://www.networksolutions.com/catalog/idnames/multilingual.html [Accessed Oct. 10, 2000].

"World's Leading Registrar, Network Solutions to Introduce Multilingual Domain Name Strategy; Offering Domain Name Registrations in Chinese, Japanese and Korean Character Sets; Businesses in Asia and Around the World Now Able to Establish and Protect Web Identietes in .com, .net and .org Multilingual Domains," Network Solutions, Inc., Oct. 3, 2000, 3 pages http://www.network solutions.com/catalog/idnames/1003press.html [Accessed Oct. 10, 200].

* cited by examiner

Example Configuration Data File for the Primary Name Server of the foo.IBM.com Zone

| | | | |
|---|---|---|---|
| 205 | primary | foo.IBM.com | db.foo.IBM |
| 210 | primary | stanford.edu | db.stanford |

Example db.foo.IBM Zone Data File for the foo.IBM.com Zone foo.IBM.com. IN SOA ns1.WebHostingCompany.com. postmaster.WebHostingCompany.com. (
;;;; information for slave name servers
    1837    ;;; serial number for this version of the zone data file
    1800    ;;; refresh after 30 minutes
    900    ;;; retry after 15 minutes
    86400    ;;; expire after 1 week
    1800    ;;; minimum Time To Live (TTL) of 30 minutes
    )

;;; name servers for the zone
    IN    NS    ns1.WebHostingCompany.com.
    IN    NS    bar ;;; mail server
    IN    MX    5   mailserver.WebHostingCompany.com.

;;; addresses
  @    IN    A    216.23.39.188
  foo    IN    A    216.23.39.180
  bar    IN    A    216.23.46.83

;;; aliases
  smtp    IN   CNAME    @
  www    IN   CNAME    @
  ftp    IN   CNAME    foo.foo.IBM.com.
  bigdaddy    IN   CNAME    bar

*Figure 2B*

Example Partial Zone Data File for the IBM.com Zone

;;; delegation of subzone foo.IBM.com to authoritative name servers for the subzone
foo    86400   IN   NS   ns1.WebHostingCompany.com.
         86400   IN   NS   bar.foo.IBM.com.
bar.foo.IBM.com.   86400   IN   A   216.23.46.83

*Figure 2C* e|

THE SOURCE FOR .CC DOMAIN NAMES

Register Your .CC Domain Now!

DOMAIN NAME: [　　　　] .CC  SUBMIT

| Now offering International Character Domains 試名 CLICK HERE TO REGISTER | LATIN-1 NOW AVAILABLE! Español  Francais Deutsch  and 16 MORE... |

| WIN UP TO $35,000 If your site is selected as the Best Designed .CC Web Site  *Click Here For Details* | WEB HOSTING STARTING AT $9.99/mo! |

ENIC HOME

Welcome to the eNIC network information center. We are proud to announce a wealth of domain name services such as faster domain name registration, unmatched technology and domain availability, as well as immediate domain management and editing.

If you have experienced trouble in the past while trying to get your name on the web, you have come to the right place. The .cc TLD makes domain names that were unavailable in the past, now available to you. Register now and find the best domain for your company or personal endeavor.

eNIC provides FREE *web* and *email* forwarding with a paid domain registration.

.CC names work worldwide exactly as do .COM names.

If you have any questions regarding your domain name please email hostmaster@nic.cc.

DOMAIN NAME: [　　　　] .CC  SUBMIT

Type a domain name in the box above to check availability of a .CC domain name and register it.

Interested in receiving commissions for the promotion of .cc domain sales through a banner or with your own registration site? Join eNIC's Partner Program.

NEW NAME ▪ EDIT DNS ▪ WHO IS?
POLICIES ▪ PAYMENTS ▪ FAQ ▪ HOME

*Fig. 3A*

THE SOURCE FOR .CC DOMAIN NAMES

305

☑ REGISTER A NEW NAME

Select an encoding 309

| 繁體中文<br>Chinese<br>(Big 5)<br>Traditional | 简体中文<br>Chinese<br>(GB)<br>Simplified | 日本語<br>Japanese<br>(SJIS) | 日本語<br>Japanese<br>(EUC) | 한국어<br>Korean<br>(KSC) |
|---|---|---|---|---|
| Big 5 | GB2312 | Shift JIS | EUC-JP | KSC5601 |

307

| Latin 1 (ISO 8859-1) | |
|---|---|
| Afrikaans<br>Afrikaans | Shqip<br>Albanian |
| Euskara<br>Basque | Català<br>Catalan |
| Dansk<br>Danish | Nederlands<br>Dutch |
| Føroya<br>Faroese | Suomea<br>Finnish |
| Français<br>French | Deutsch<br>German |
| Islensku<br>Icelandic | Gæilge<br>Irish |
| Norsk<br>Norwegian | Portuguìs<br>cv/br/eu Portuguese |
| României<br>Rhaeto-Romanic | Scotts Gæilge<br>Scottish |
| Español<br>Spanish | Kiswahili<br>Swahili |
| Svenska<br>Swedish | MORE COMING SOON! |

*Fig. 3B*

Search For a New Domain Name

319 { Warning!: *Changing the Encoding Type will reset the cart.*
BIG5 | KSC5601 | Shift JIS | EUC-J | GB2312

DOMAIN NAME: [ 삼성 회사 ] .CC   Encoding } 318
                                      KSC5601
                    316

SUBMIT

International Domain Name Registration Surcharge:
Waived

315

NEW NAME   EDIT DNS   WHO IS?
POLICIES   PAYMENTS   FAQ   HOME

KSC5601: 0xC701 0xB1B9 ⟵ 322
Unicode: U+D55C U+AD6D ⟵ 323
UTF-5 ACE T55C QD6D ⟵ 324

Example Multilingual Domain Name Registry Database

| | ASCII And ASCII-Compatible Encoding Domain Names *337* | Registrant *339* | |
|---|---|---|---|
| *340* | alpha.cc | Bob Smith | |
| *342* | amethyst-rings.cc | Jim Jones | |
| *344* | ⋮ | | ... |
| *346* | race.cc | Helen Keller | |
| *348* | ra--b971b054.cc | Chun Ahn | |
| *350* | ra--t55cqd6d.cc | Doug White | |
| *352* | reckless.cc | Billy TheKid | |
| | ⋮ | | |

*Fig. 3H*

Example db.CC Zone Data File for a ".CC" Zone

```
cc.            IN      SOA     ns1.nic.cc.             postmaster.nic.cc.
;;; information for slave name servers
                    1837        ;;; serial number for this version of the zone data file
                    1800        ;;; refresh after 30 minutes
                    900         ;;; retry after 15 minutes
                    86400       ;;; expire after 1 week
                    1800        ;;; minimum Time To Live (TTL) of 30 minutes
                    )
;;; name servers for the zone
               IN       NS      ns1.nic.cc.
               IN       NS      ns2.nic.cc.
               IN       NS      ns1.globaldns.com.

;;; addresses
     @         IN       A       226.23.39.188
     alpha     IN       A       225.78.83.242
     amethyst-rings IN  A       178.123.32.138
       ⋮
     ns1.nic   IN       A       225.31.53.23                   356
       ⋮
     race      IN       A       225.31.32.45
     reckless  IN       A       67.79.35.15
       ⋮
     *         IN       A       234.71.83.24           358
```

*Fig. 3I*

Example Multilingual Domain Name Binary Variants Database

|     | 362<br>Binary Variants | 364<br>Corresponding Registered Domain Name | 366<br>Encoding Type | 368<br>Primary Or Secondary |
|-----|---|---|---|---|
| 370 | b971b054 | ra--b971b054.cc | Big 5 | 1 |
| 371 | 1b244245453f76 | ra--b971b054.cc | JIS | 0 |
| 372 | 93649075 | ra--b971b054.cc | Shift-JIS | 0 |
| 373 | b5e7d1b6 | ra--b971b054.cc | GB2312 | 0 |
| 374 | b5e7d38d | ra--b971b054.cc | GB2312 | 0 |
| 375 | b971b074 | ra--b971b054.cc | Big 5 | 0 |
| 376 | c2b971c2b054 | ra--b971b054.cc | "Dumb UTF-8" | 0 |
| 377 | c2b971c2b074 | ra--b971b054.cc | Lower-cased "Dumb UTF-8" | 0 |
| 378 | c5c5bfd6 | ra--b971b054.cc | EUC-JP | 0 |
| 379 | e794b5e8a88a | ra--b971b054.cc | UTF-8 | 0 |
| 380 | e794b5e8aeaf | ra--b971b054.cc | UTF-8 | 0 |
| 381 | e99bbbe8a88a | ra--b971b054.cc | UTF-8 | 0 |
| 382 | e99bbbe8aeaf | ra--b971b054.cc | UTF-8 | 0 |
| 383 | eb8ad1b6 | ra--b971b054.cc | GB2312 | 0 |
| 384 | eb8ad38d | ra--b971b054.cc | GB2312 | 0 |
| 385 | efb3e3f2 | ra--b971b054.cc | KSC 5601 | 0 |
|     | ⋮ | | | |
| 386 | cd38sl93 | ra--cd38sl93.cc | KSC 5601 | 1 |
|     | ⋮ | | | |

*Fig. 3J*

Example ACE Forwarding Database

|     | 388<br>ACE Domain Names | 389<br>URL Forwarding |
|-----|---|---|
|     | ⋮ | |
| 394 | ra--b971b054.cc | 228.32.98.20 |
| 396 | ra--t55cqd6d.cc | http://www.samsung.com/korean.html |
|     | ⋮ | |

*Fig. 3K*

Domain Registered in Traditional Chinese Big 5

電訊.cc

Traditional Chinese Big 5 (1 variant)

電配

Simplified Chinese GB (4 variants)

電訊　電訊　电訊　电讯

Japanese Shift-JIS (1 variant)

電訊

Japanese JIS (1 variant)

Does not display correctly.

Japanese EUC-JP (1 variant)

電訊

Korean KSC (1 variant)

電訊

UTF-8 (6 variants)

¹q°T　¹q°t　電訊　電讯　电訊　电讯

*Fig. 3L* eNIC .CC: The Universal Internet Address

| Home | Services | Domain Management | Partner Central | Policies | Investor Relations | Career | Shopping Cart |

| News | Contact Us | About eNIC |

Register a Domain
Multilingual Whois
English to CJK Translator
Lookup by Reference Code
Multilingual INFO/FAQ

English only? Not here!

Pick the language that works for you. We did the work to make it easy. You can register your site in more than 28 active Asian, Middle Eastern and European languages.

This is not a test. Our system works.

While some of our competitors provide a "testbed" version of multilingual software, we've delivered a fully-functional system that works for thousands of dot.cc customers.

We provide different forms of the same languages, so you can register your site in traditional and simplified Chinese or different Japanese character sets. We make it easy to ensure that all variants of a domain name point to the same site.

We're bringing the world to the World Wide Web.

Select a Language or Encoding to use:

Asian | Arabic | Hebrew | European / Afrikaan / Americas

Asian Language
(Chinese / Japanese / Korean encodings)

| 繁體中文 | 简体中文 | 日本語 | 日本語 | 한국어 |
|---|---|---|---|---|
| Chinese | Chinese | Japanese | Japanese | Korean |
| Big5 | GB | SJIS | EUC | KSC |
| Traditional | Simplified | | | |
| Big5 | GB-2312 | Shift-JIS | EUC-JP | KSC-5601 |

Arabic Language
(ISO 8859-6 encoding)

| العربية | فارسی | اردو |
|---|---|---|
| Arabic | Persian | Urdu |

*Fig. 3M*

Hebrew Language
(ISO 8859-8 encoding)

עברית   ייִדיש
Hebrew   Yiddish

Latin 1 Language
(ISO 8859-1 encoding)

Afrikaans
Afrikaans

Shqip
Albanian

Euskara
Basque

Català
Catalan

Dansk
Danish

Nederlands
Dutch

Føroya
Faroese

Suomea
Finnish

Français
French

Deutsch
German

Islensku
Icelandic

Gæilge
Irish

Italiano
Italian

Norsk
Norwegian

Portuguìs
cv/br/eu Portuguese

României
Rhaeto-Romanic

Scotts Gæilge
Scottish

Español
Spanish

Kiswahili
Swahili

Svenska
Swedish

Services | Domain Management | Partner Central | Policies | Investor Relations | Career
News | Contact Us | About eNIC

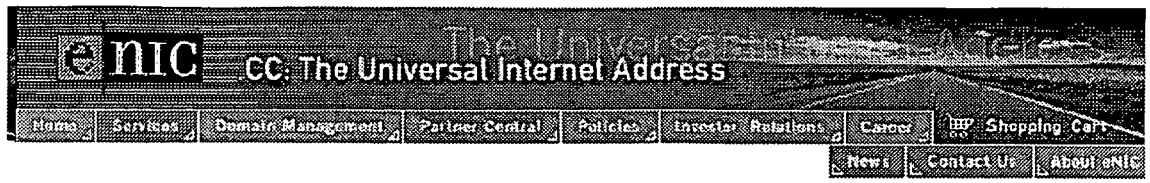

Search Results for 'application'

Select up to 5 Domain names

Add to Cart

| | | |
|---|---|---|
| ☐ | 用途 .cc | application |
| ☐ | 应用 .cc | application |
| ☐ | 应用程式 .cc | application |
| ☐ | 申请书 .cc | application |
| not available | 申请 .cc | application (form, etc.) |
| ☐ | 应用层 .cc | application layer |
| ☐ | 应用平台 .cc | application platform |
| ☐ | 应用程式介面 .cc | application programming interface |
| ☐ | 应用软件 .cc | application software |
| ☐ | 应用软体 .cc | application software |
| ☐ | 专用集成电路 .cc | application-specific integrated circuit |
| ☐ | 商业应用 .cc | business application |
| ☐ | 客户应用 .cc | client application |
| ☐ | 网络应用 .cc | network application |
| ☐ | 网路应用 .cc | network application |
| ☐ | 实际应用 .cc | practical application |
| not available | 招聘 .cc | take job applications |
| ☐ | 典型用途 .cc | typical application |

Add to Cart    Clear All

*Fig. 3Q*

REGISTERING AND USING MULTILINGUAL DOMAIN NAMES

CROSS REFERENCE TO RELATED APPLICATION

This application is a continuation of application Ser. No. 09/974,746 filed Oct. 09, 2001 now abandoned, which claims the benefit of U.S. Provisional Application No. 60/239,170 filed Oct. 9, 2000, which are hereby incorproated by reference in their entirety.

TECHNICAL FIELD

The following disclosure relates generally to registering and using domain names, and more particularly to various techniques for registering and using multilingual domain names.

BACKGROUND

The Internet enables a user of a client computer system to identify and communicate with millions of other computer systems located around the world. A client computer system can identify each of these other computer systems using a unique numeric identifier for that computer called an "IP address." When a communication is sent from a client computer system to a destination computer system, the client computer system typically specifies the IP address of the destination computer system in order to facilitate the routing of the communication to the destination computer system. For example, when a request for a World Wide Web page ("Web page") is sent from a client computer system to a Web server computer system ("Web server") from which that Web page can be obtained, the client computer system typically includes the IP address of the Web server.

In order to make the identification of destination computer systems more mnemonic, a Domain Name System (DNS) has been developed that translates a unique alphanumeric name (having only characters from a subset of 7-bit ASCII characters) for a destination computer system into the IP address for that computer. The alphanumeric name is called a "domain name." For example, the domain name for a hypothetical computer system operated by IBM Corporation may be "comp23.IBM.com". Using domain names, a user attempting to communicate with this computer system could specify a destination of "comp23.IBM.com" rather than the particular IP address of the computer system (e.g., 198.81.209.25).

A user can also request a particular resource (e.g., a Web page or a file) that is available from a server computer by specifying a unique Universal Resource Indicator ("URI"), such as a Uniform Resource Locator ("URL"), for that resource. A URL includes a protocol to be used in accessing the resource (e.g., "http:" for the HyperText Transfer Protocol ("HTTP")), the domain name or IP address of the server that provides the resource (e.g., "comp23.IBM.com"), and optionally a path to the resource (e.g., /help/HelpPage.html")—thus "comp23.IBM.com/help/HelpPage.html" is one example of a URL. In response to a user specifying such a URL, the comp23.IBM.com server would typically return a copy of the "HelpPage.html" file to the user.

The domain names in DNS are structured in a hierarchical, distributed database that facilitates grouping related domain names and computers. In particular, as mentioned above, a particular domain name such as "IBM.com" may identify a specific host computer. However, the hierarchical nature of DNS also allows a domain name such as "IBM.com" to represent a domain including multiple other domain names each identifying computers (also referred to as "hosts"), either in addition to or instead of identifying a specific computer. FIG. 1 illustrates a hypothetical portion of the DNS database 100 in which the node representing the IBM.com domain name 110 is the root node in an IBM.com domain 150 that includes 7 other nodes each representing other domain names. Each of these domain names in the IBM.com domain can be, but do not have to be, under the control of a single entity (e.g., IBM Corporation). FIG. 1 also includes a WebHostingCompany.com domain 155 that includes a single domain name.

As is illustrated, the DNS database can be represented with a hierarchical tree structure, and the full domain name for a given node in the tree can be determined by concatenating the name of each node along the path from the given node to the root node 101, with the names separated by periods. Thus, the 8 nodes in the IBM.com domain represent the domain names IBM.com 110, foo.IBM.com 112, foo.foo.IBM.com 118, bar.foo.IBM.com 120, bar.IBM.com 114, comp23.IBM.com 116, abc.comp23.IBM.com 122, and cde.comp23.IBM.com 124. Other ".com" domain names outside the IBM.com domain are also illustrated in FIG. 1, including the second-level domain names BCD-Corp.com 132, WebHostingCompany.com 134, 1-800-555-1212.com 142 and 123456.com 144, and the lower-level domain names 123.123456.com 146 and 456.123456.com 148. In addition to the ".com" top-level domain ("TLD"), other TLDs are also illustrated including the ".cc" geographical TLD and the ".gov", ".edu" and ".mil" organizational TLDs. Illustrated domain names under these other TLDs include Stanford.edu 136, Berkeley.edu 138, and RegistrarCompany.cc 140.

To facilitate the translating of DNS domain names to IP addresses, a network of domain name server computer systems ("domain name servers") that maintain mappings from domain names to IP addresses is distributed throughout the Internet. For any particular domain name, at least one domain name server is designated as being authoritative for that particular domain name and can determine one or more IP addresses to which the particular domain name should be mapped. When another computer requests the one or more IP addresses for a domain name, an authoritative domain name server for that domain name can then make the appropriate IP addresses available to the requestor. A piece of software that is commonly used to implement the DNS protocols is the Berkeley Internet Name Domain ("BIND") software, available at the time of this writing at "www.isc.org/products/BIND/". This software assists authoritative domain name servers to maintain the appropriate mapping information for domain names, and also assists other computers in identifying the domain name servers that are authoritative for a domain name when needed.

Each domain name will have one authoritative name server that is designated as the primary master name server ("primary name server") for that domain name, and the primary name server will have control over the stored information (including the IP addresses) for that domain name. Rather than being associated directly with domain names, each name server is actually associated with one or more zones of domain names, with each zone including one or more related domain names. Thus, the primary name server for a zone will store various information about the domain names in that zone in a zone data file. If there are additional non-primary name servers that are authoritative for the domain name, these name servers are referred to as "slave name servers," and they obtain their domain name information from the appropriate primary name server. Zone data files typically include information indicating the primary name server for the zone, slave name servers for the zone, domain name-to-IP address mappings for each domain name in the zone, domain name aliases that represent other domain names in the zone, and a serial number indicating a version of the zone data file. Each entry in the zone data file is referred to as a DNS resource record. A primary or slave name server for a zone can be a host computer associated with one of the domain names in the zone, or can instead be associated with a domain name located elsewhere in the DNS database hierarchy.

Thus, in order for a client computer to request a resource that is indicated by a URL containing a domain name, the client first determines the appropriate IP address for the domain name from one of the authoritative name servers for the zone that includes the domain name. After the name server provides the IP address to the client, the client can then use that information to contact the server computer with that IP address and request that the server provide the resource corresponding to the URL.

However, in order to obtain the IP information that corresponds to a domain name, the client computer needs to be able to identify an authoritative name server for the domain name. Requests to identify an authoritative name server for a domain name are resolved by DNS in a hierarchical manner. In particular, one or more root name servers maintain information about the authoritative name servers for each of the TLDs (e.g., ".com" and ".cc"). In response to requests, those TLD name servers can then provide information about the authoritative name servers for the second-level domains—for example, an authoritative name server for the ".com" TLD will know the authoritative name servers for the second-level IBM.com domain. Continuing in this hierarchical manner as necessary, the authoritative name servers for the domain name of interest can be identified.

The manner in which the TLD name servers obtain and store information about the second-level domains varies for different TLDs, and is affected by the domain name registrars for the TLDs. In particular, a company that serves as a registrar for a TLD assists customers in registering new domain names for that TLD and performs the necessary actions so that the technical DNS information for those domain names is stored in a manner accessible to the name servers for that TLD. Registering a domain name includes creating DNS resource records for the domain name that are stored in an appropriate location, such as a new zone file corresponding to the new domain name or in an existing zone file. Registrars often maintain a second-level domain name within the TLD (e.g., a hypothetical Registrar Company that acts as a registrar for the ".cc" TLD could maintain the RegistrarCompany.cc domain name 140), and provide an interactive Website at their domain name from which customers can register new domain names. A registrar will typically charge a customer a fee for registering a new domain name.

For the ".com", ".net" and ".org" TLDs, a large number of registrars currently exist, and a single shared registry ("the Registry") under the control of a third-party administrator stores information identifying the authoritative name servers for the second-level domain names in those TLDs. Thus, each of the registrars supplies the appropriate name server information to be stored in the Registry for the second-level domain names that they register, and the authoritative name servers for these TLDs obtain the delegation information about the second-level domains' authoritative name servers from the Registry. In this shared registry arrangement, the administrator of the Registry charges each registrar a fee when the registrar registers a new second-level domain name.

Other TLDs may have only a single registrar, and if so that registrar could maintain a registry for all the second-level domains in that TLD by merely storing the appropriate DNS information for each domain name that the registrar registers. In other situations, multiple registrars may exist for a TLD, but one of the registrars may serve as a primary registrar that maintains a registry for each of the second-level domains in that TLD—if so, the secondary or affiliate registrars for that TLD supply the appropriate DNS information for the domain names that they register to the primary registrar. Thus, the manner in which the DNS information for a TLD is obtained and stored is affected by the registrars for that TLD.

In addition to registering new domain names, registrars are also responsible for maintaining administrative information (also referred to as "whois data" or a DNS whois record) about their domain names that identifies the current administrative contact for the domain name, and can include additional information such as the "registrant" (i.e., owner) of the domain name, when the domain name was first created and when the administrative information was last modified.

Thus, the registering of new second-level domain names includes specifying a primary name server for the domain name, with the primary name server typically storing the technical DNS information for the domain name in a zone data file as described above. In addition to using zone data files, a primary name server typically also uses a configuration file that lists each zone for which the name server is responsible and the zone data file for that zone.

As an illustrative example, consider a zone that includes domain names foo.IBM.com 112, foo.foo.IBM.com 118, and bar.foo.IBM.com 120. FIG. 2A provides one example of a configuration file for the name server that is the primary name server for the foo.IBM.com zone, as is indicated in line 205 of the file. As is shown in the DNS configuration record in line 205, the zone data file for the foo.IBM.com is named "db.foo.IBM". In the illustrative example, the name server is also shown in the second DNS configuration record at line 210 to be the primary name server for the stanford.edu zone. Thus, when this name server begins to execute, it will read each of the listed zone data files to obtain the zone information for those zones. Those skilled in the art will appreciate that different formatting may be used for a configuration file in different situations, such as for different versions of the BIND software.

FIG. 2B illustrates an example of a possible db.foo.IBM zone data file for the foo.IBM.com zone. As those skilled in the art will appreciate, the second and third DNS resource records in the zone data file indicate that a computer with the domain name ns1.WebHostingCompany.com (not illustrated in FIG. 1) is the primary name server for the foo.IBM.com zone, and that a computer with the bar.foo.IBM.com domain name is a slave name server. Other DNS resource records include a variety of other DNS information about the foo.IBM.com zone.

As mentioned above, an authoritative name server for a zone maintains information on the authoritative name servers for subzones of the zone. Thus, the authoritative name servers for the IBM.com zone need to maintain information to allow them to delegate requests about the foo.IBM.com subzone to the primary and slave name servers for that subzone, namely ns1.WebHostingCompany.com and bar.foo.IBM.com respectively. The zone data file for the IBM.com zone could include the additional entries illustrated in FIG. 2C to delegates requests about the foo.IBM.com zone to the ns1.WebHostingCompany.com and bar.foo.IBM.com domain names.

Additional details about DNS and the Bind software are available in "DNS and Bind, Third Edition" by Paul Albitz & Cricket Liu, 1998, ISBN 1-56592-512-2, O'Reilly & Associates Publishing, Sebastopol, Calif. 95472, which is hereby incorporated by reference in its entirety. Additional information related to the manner in which domain names and other characters are encoded is included in the "Introduction" section of the "Requirements of Internationalized Domain Names" document, which is attached as Appendix A, and in "The Unicode Standard, Version 3.0", 2000, ISBN 0-201-61633-5, Addison Wesley Longman, which is hereby incorporated by reference in its entirety.

While the DNS system provides many benefits, various problems exist. For example, domain names can typically only be encoded using a subset of 7-bit ASCII characters, thus preventing the characters of a large number of foreign languages and scripts from being used in domain names that are being registered and/or used. As many users desire to use multilingual internationalized domain names that include one or more characters outside the current 7-bit ASCII character subset, it would be beneficial to be able to register and use such multilingual domain names.

BRIEF DESCRIPTION OF THE DRAWINGS

FIGS. 2A-2C are examples of DNS data files.

FIGS. 3A-3G and 3M-3Q illustrate embodiments of using an example Multilingual Domain Name system to register and use multilingual domain names.

FIGS. 3H-3K illustrate example data structures associated with the registration and use of multilingual domain names.

FIG. 3L illustrates an example multilingual domain name and example associated binary variants for the domain name.

DETAILED DESCRIPTION

Figure 1:
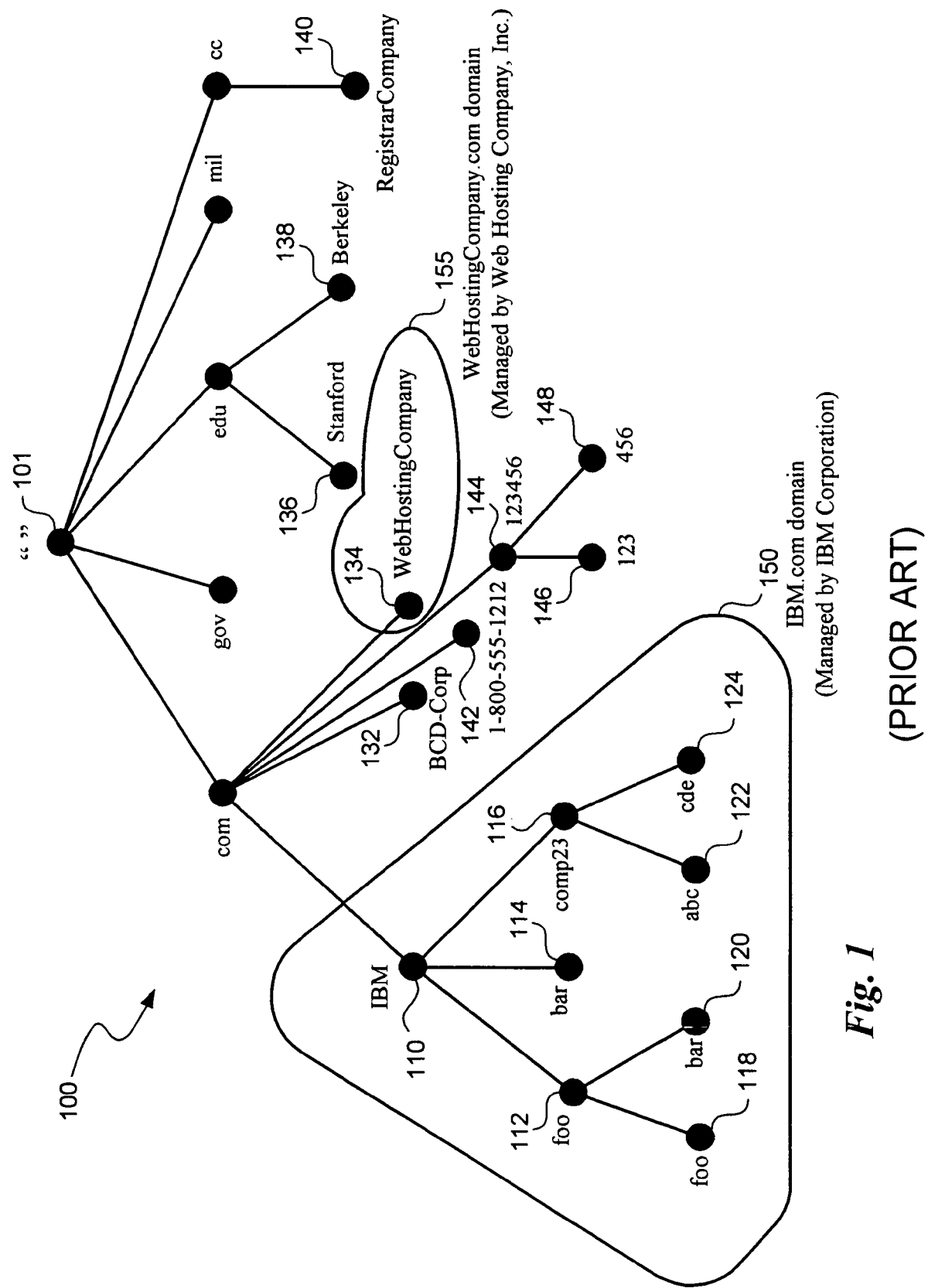
FIG. 1 is a network diagram illustrating interconnected network devices and Domain Name System (DNS) information.

A software facility is described below that provides various techniques for registering and using multilingual domain names. In some embodiments, a DNS system that supports domain names that are encoded only with a subset of ASCII characters is used, and multilingual domain names that include characters outside the ASCII character subset are converted into appropriate ASCII-Compatible Encodings (ACEs) that use only characters within the ASCII character subset. Such ACEs can then be registered in such a manner as to represent the corresponding multilingual domain names. In addition, in some embodiments a variety of binary variants are generated for each multilingual domain name and are treated as equivalent to the multilingual domain name. These variants may in some embodiments be stored in the registry as alternative domain names corresponding to the same IP address as the primary domain name (e.g., the ACE for the multilingual domain name), or instead may be stored in other embodiments in an alternative data structure in which they are processed separately from registered domain names.

For illustrative purposes, some embodiments of the software facility are described below in which specific types of character set encodings are used and in which multilingual domain names and their variants are generated and stored in particular ways. However, those skilled in the art will appreciate that the techniques of the invention can be used with a wide variety of other multilingual domain names and types of storage, some of which are discussed below, including embodiments in which an enhanced DNS allows non-ASCII characters to be transmitted and stored. In addition, those skilled in the art will appreciate that the techniques of the invention could similarly be used with types of textual identifiers other than domain names.

In particular, in some embodiments a Multilingual Domain Name (MDN) system facility allows users to register multilingual internationalized domain names that include characters outside the ASCII character subset typically supported by DNS, such as by specifying such domain names by using a Web browser that supports non-ASCII character sets. The domain name specification can in some embodiments take place via a registration Web page supported by a domain name registrar that incorporates or interacts with an MDN system. In such embodiments, after a user uses a Web browser to display the registration Web page and then specifies a multilingual domain name using that Web page, the user's Web browser sends to the MDN system an indication of the specified multilingual domain name, such as by transmitting an indication of the character set encoding used for the multilingual domain name and a binary value equivalent of the domain name. Such binary value equivalents are formed by representing each character of the domain name with the binary equivalent for that character from the character set (e.g., in hexadecimal format such that each hexadecimal value represents four bits of an eight-bit byte). For some character sets and characters a single hexadecimal number could be used to represent a character, while other characters in other character sets may instead need multiple hexadecimals numbers to represent them (e.g., multi-byte character sets).

After the MDN system receives an indication of the specified multilingual domain name, the system determines a corresponding ACE that uses only characters within the DNS ASCII character subset (as discussed in greater detail below). The system next determines if the ACE is present in the domain name registry, and if not then in some embodiments the specified multilingual domain name is considered to be available to be registered. In other embodiments, some or all of the registered multilingual domain names may each have one or more binary variants (discussed in greater detail below) that are treated equivalently to those domain names, and if so the binary value for the specified multilingual domain name and/or some or all of the binary variant values for the specified multilingual domain name may also be checked against previously reserved binary variants, with the specified multilingual domain name considered to be available for registration only if its corresponding ACE is not registered and none of the checked binary values are reserved. Such binary variants can be reserved and maintained in various ways, such as by maintaining a separate database data structure of such reserved binary variants.

In order to register the specified multilingual domain name, the MDN system in some embodiments stores the corresponding ACE in the registry and associates various administrative information with the ACE. While in some embodiments the ACE may also have an associated IP address in the registry, in other embodiments the ACE is instead added during the registration process to a separate ACE forwarding database with an indication of a URL (or an IP address) to which the specified multilingual domain name corresponds and to which requests including the multilingual domain name will be forwarded, such as for a Web page or Web server corresponding to the multilingual domain name. Binary variants can also in some embodiments be generated for the specified multilingual domain name and stored in a separate binary variants database with an indication of the registered ACE for the multilingual domain name.

When a user later initiates a resolution request for the IP address associated with the multilingual domain name (such as by requesting a URL that includes the multilingual domain name), the MDN system may receive an indication of the binary value for the multilingual domain name but not receive an indication of the encoding system that corresponds to the binary value (e.g., due to the manner in which Web browsers and/or DNS software transmit characters). However, a particular binary value may correspond to various different domain names in different character set encodings. Thus, the MDN system uses the various information stored during the registration process to identify the appropriate multilingual domain name for the received binary value, and responds in the appropriate manner to the resolution request.

In particular, in some embodiments the MDN system responds to a resolution request for a multilingual domain name by providing the IP address of an MDN server that can process URL requests that include such multilingual domain names. When the MDN server then receives such a URL request, the MDN server determines how to respond based on the information about the multilingual domain name that is received (e.g., the binary value for the multilingual domain name). For example, if the MDN server can also determine the encoding system used (e.g., based on a received indication or based on the particular binary values received), the server can generate a corresponding ACE for the multilingual domain name in the same manner as during registration. If only the binary value for the multilingual domain name is received, however, the server instead determines if the received binary value is stored in the separate binary variants database, and if so retrieves an indication of the ACE that corresponds to the binary value. After the ACE is determined, the MDN server can next retrieve the IP address or URL information associated with the ACE (e.g., from an entry in the ACE forwarding database that corresponds to the ACE), and then redirects the received request to that URL or IP address. Those skilled in the art will appreciate that other methods could alternatively be used to process a received binary value, such as by generating corresponding ACEs for each encoding system available and determining if any such ACEs are stored in the ACE forwarding database.

After the client device used by the user receives the IP address associated with the multilingual domain name, the client can send an appropriate message (e.g., an HTTP Request message for a particular URL) to the server with that IP address. If the client receives a Web page in response, the client can then present the Web page to the user.

Those skilled in the art will appreciate that IP resolution requests for multilingual domain names that are represented with only binary values can be processed in a variety of ways. In some embodiments, the last entry in the zone data file corresponding to the multilingual domain name is a wildcard entry that matches any domain name requested if no earlier explicit entries matched (including the binary value domain names). This wildcard entry could include the IP address of an MDN server that would determine the corresponding ACE for the multilingual domain name and respond accordingly, such as in the manner described above. In other embodiments, each binary variant could be stored in the zone data file with an indication of the MDN server IP address. Such an MDN server could also use various information included in header fields of the HTTP message for the URL request (e.g., a cookie previously created by the MDN system), to determine how to respond to the URL request.

The "Requirements of Internationalized Domain Names" document, attached as Appendix A, contains additional information related to using multilingual domain names.

Figure 3C:
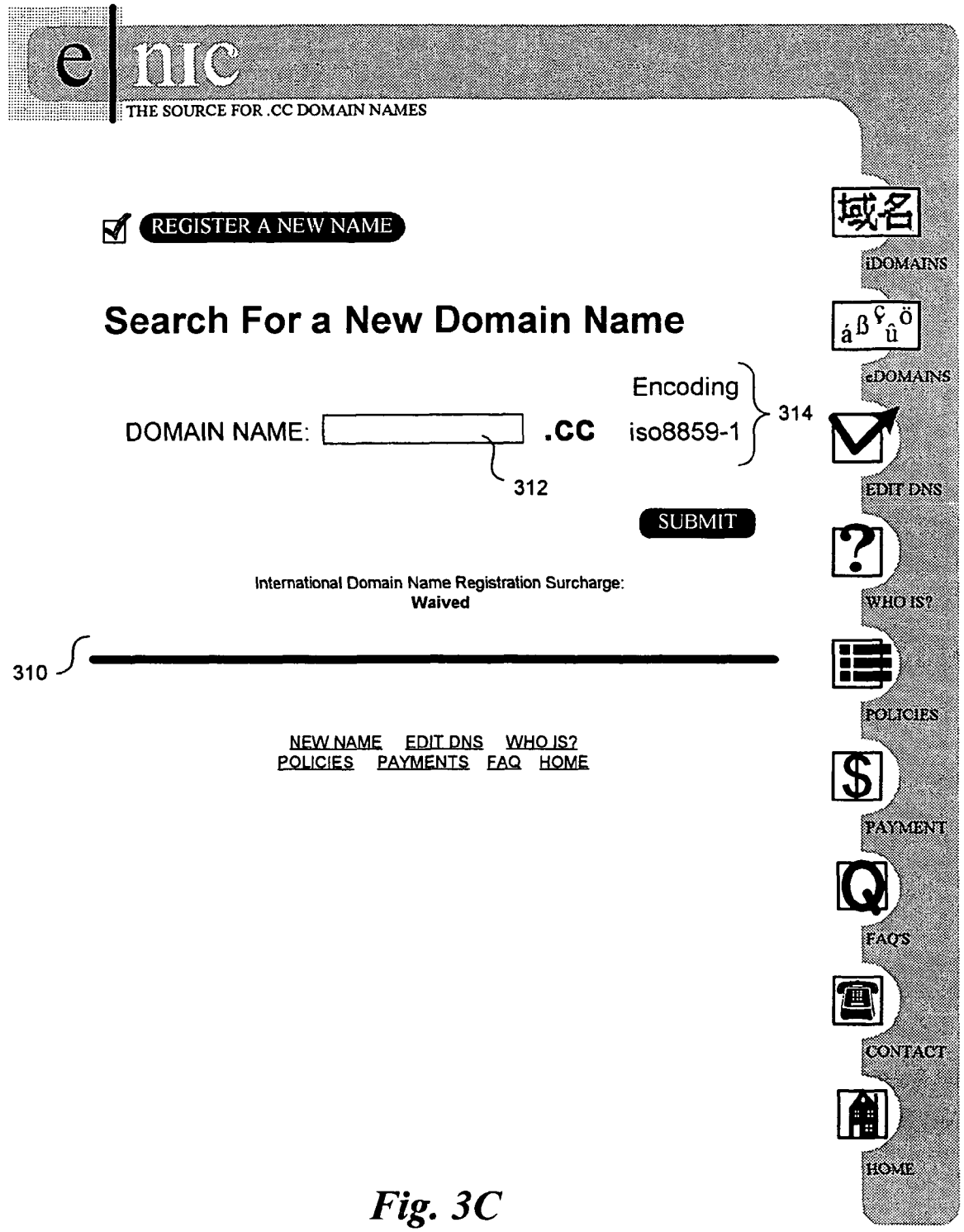

As an illustrative example of the use of the MDN system, consider the multilingual domain name registration request illustrated in FIGS. 3A-3D. In FIG. 3A, a user is interacting with a Web browser program on a client computer that has a Web page 300 displayed. Web page 300 is an interactive domain name registration page provided by a registrar for a TLD, such as the registrar eNIC Corporation for the ".cc" TLD (at the time of this writing, a similar page is available at URL "www.enic.cc/"). In addition to a field 302 in which a user can specify a domain name using the typical DNS ASCII character subset, the Web page also includes user-selectable indications 303 and 304 to select Web pages from which international multilingual domain names can be registered. Such international multilingual domain names include domain names with characters in non-English Latin-1 character set encodings (e.g., ñ and ö) that are outside the DNS ASCII character subset, as well as languages (e.g., Japanese) that use other character set encodings.

In response to the user selecting indications 303 or 304, the user in the illustrated embodiment receives a response Web page 305 that is illustrated in FIG. 3B. In particular, the Web page includes a group 307 of user-selectable indications of non-English languages that use versions of the Latin-1 character set (also referred to as "ISO 8859-1"), and the user can receive an appropriate Web registration page with which to register a multilingual domain name in one of the languages by selecting the appropriate indication. If so, the user receives a response Web page 310 as illustrated in FIG. 3C that includes a field 312 in which the user can specify a multilingual domain name in the indicated language. The Web page also includes an indication 314 of the encoding associated with the specified domain name. If the user specifies a multilingual domain name and selects the "Submit" button, the MDN system will receive an indication of the domain name specified and of the encoding type. FIGS. 3M and 3N illustrate an alternative Web page for selecting a language and/or encoding for a new multilingual domain name to be registered, and FIG. 3O illustrates an alternative Web page with which a user can specify a multilingual domain name.

FIG. 3B also includes an indication of a group 309 of user-selectable indications of character encoding types other than Latin-1, such as those corresponding to languages like Chinese, Japanese and Korean. If the user selects one of the indications in group 309 rather than one in group 307, such as the indication for the Korean language encoded with the KSC 5601 character set, the user will in the illustrated embodiment instead receive response Web page 315 as illustrated in FIG. 3D, which includes a field 316 in which the user can specify a multilingual domain name in Korean. As noted by indication 318, the character set encoding used for the specified domain name will be KSC5601, and a group 319 of user-selectable indications allow the user to change the encoding type being used. In the illustrated embodiment, the user has specified a multilingual domain name within the ".cc" TLD using Korean characters that are illustrated in the field 316.

Figure 3E:

When the user selects the "Submit" button, the MDN system will receive an indication of the specified multilingual domain name, such as an indication of the KSC 5601 encoding type used and a binary value that reflects the values assigned to the characters in the specified domain name by the KSC 5601 encoding system. By knowing both the encoding systems and the binary value, the MDN system can re-create the characters of the specified domain name. FIG. 3E illustrates examples of two binary values for the Korean language domain name 320 using two different encoding systems, those being a binary value 322 that in hexadecimal format is "C701 B1 B9" based on the selected KSC 5601 encoding system, and an alternative Unicode-based binary value 323 of "D55C ADGD". FIG. 3E also illustrates an example ACE for the Korean domain name based on the UTF-5 version of Unicode, that being ACE value 324 "T55C QD6D". Those skilled in the art will appreciate that ACEs can be generated in a variety of ways. The "RACE: Row-based ASCII Compatible Encoding for IDN" document, which is attached as Appendix B, illustrates another example algorithm for generating ACEs. In addition, various software is available to generate similar ACEs, such as the "CCODE" program available at the time of this writing at "www.i-dns.net/support/download .htrnl", and various online services may similar generate ACEs.

As described in greater detail below, when the MDN system receives a multilingual domain name registration request, the system determines if the specified domain name is available to be registered, and if so collects various related information (e.g., the corresponding IP address) and registers the domain name.

Figure 3F:
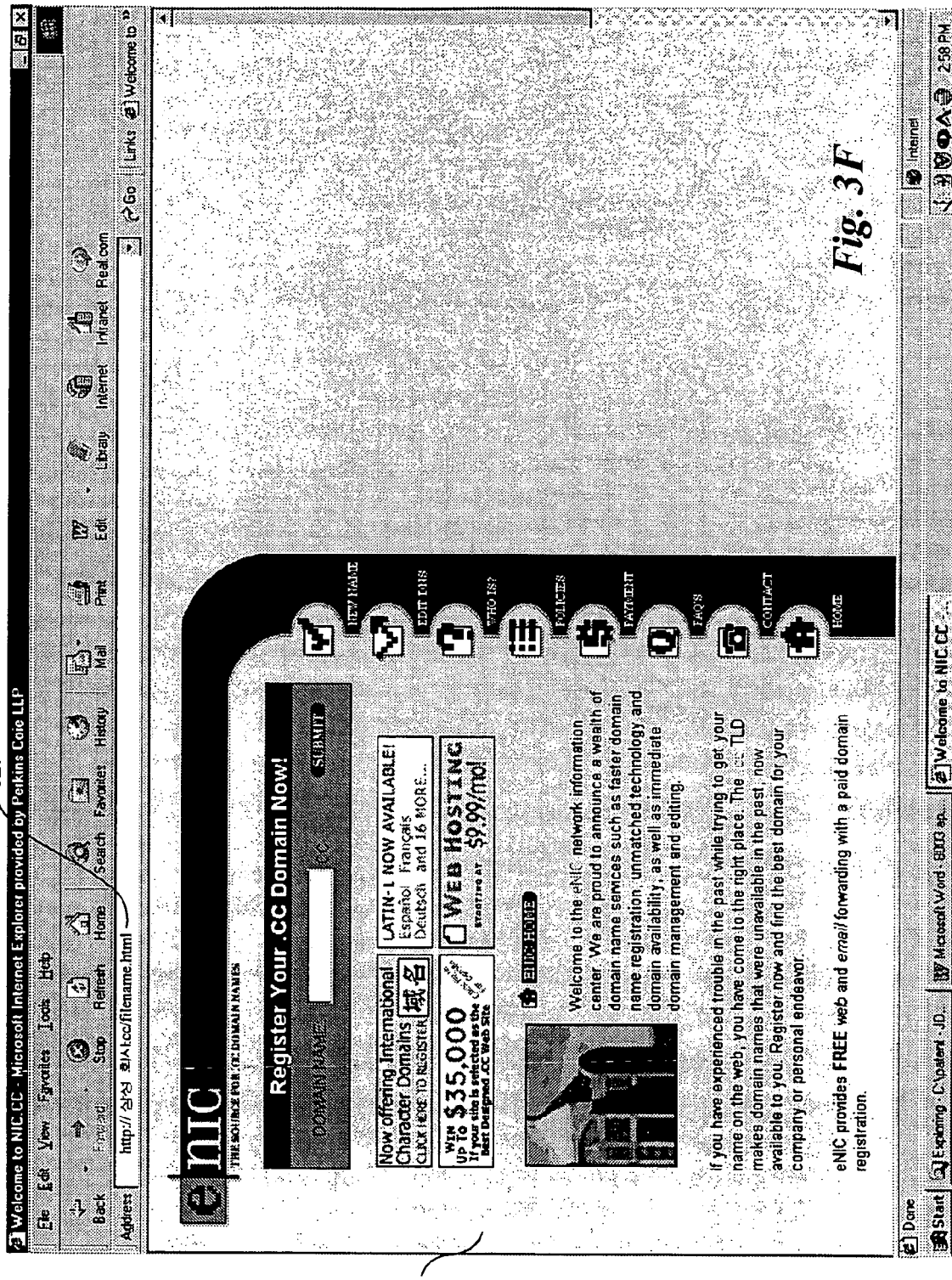
Figure 3G:
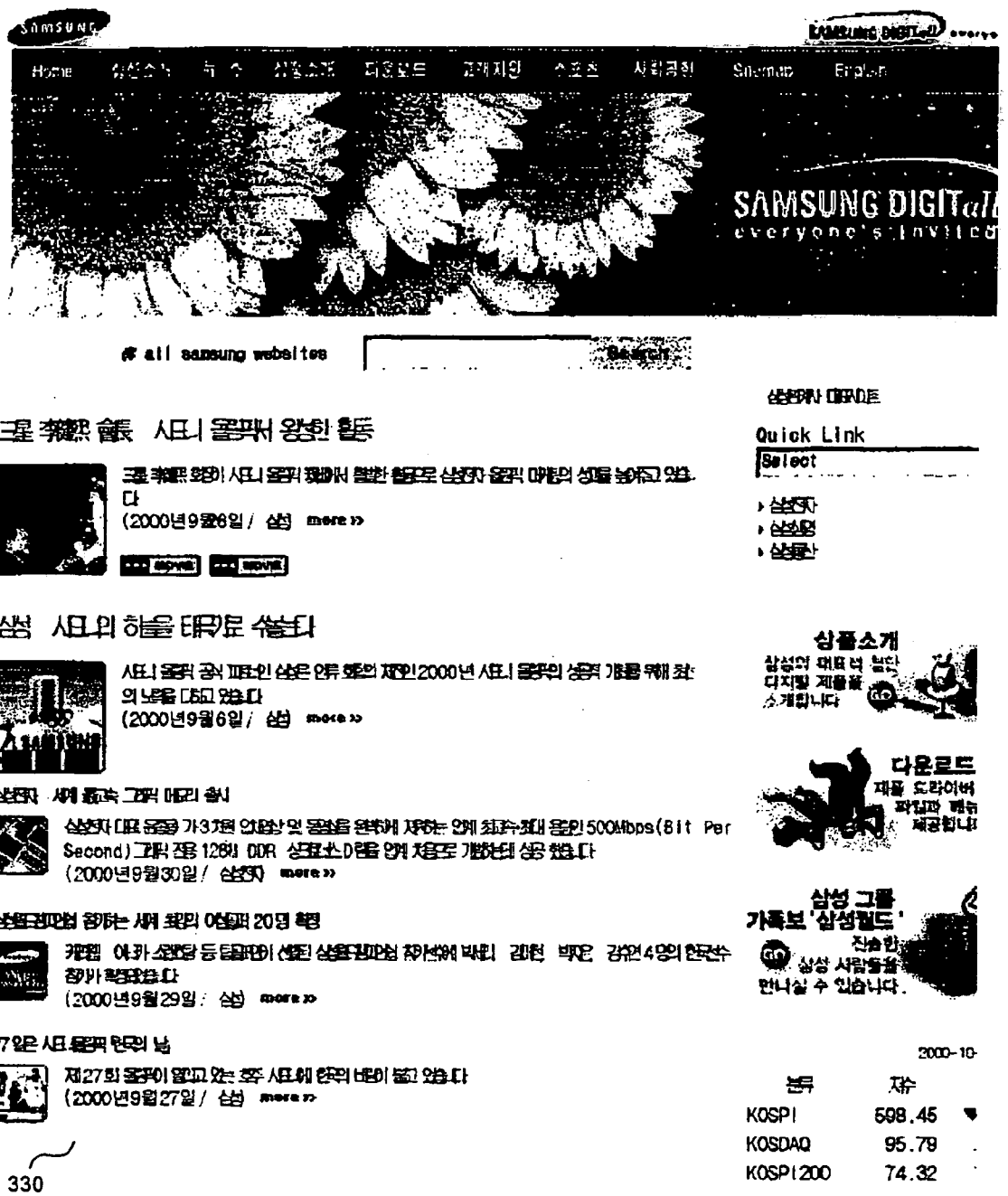
Figure 30:
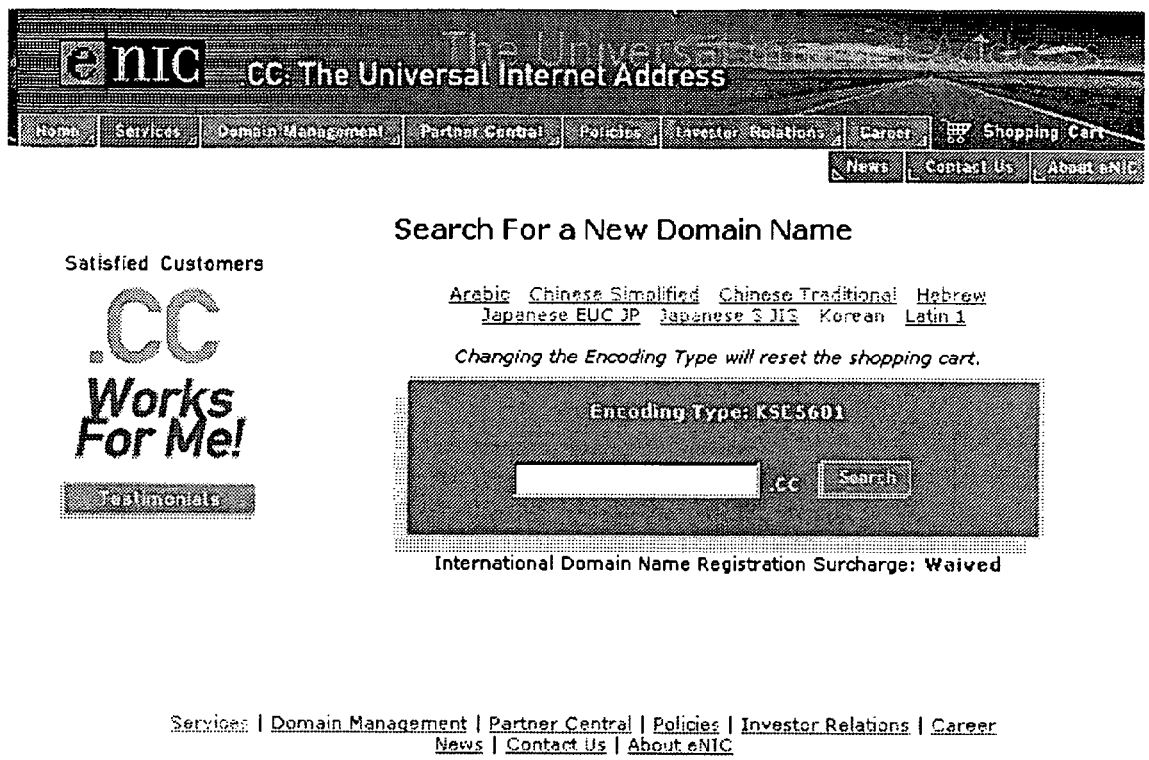

FIGS. 3F and 3G illustrate the use of multilingual domain names. In particular, as is illustrated in FIG. 3F, a user is currently viewing Web page 325 in a Web browser. The user is in the process of requesting a new Web page by specifying a URL 327 to the browser that includes the multilingual Korean domain name registered in FIG. 3D. In order to retrieve the URL, the Web browser first needs to determine the IP address that corresponds to the specified multilingual domain name. Thus, the Web browser attempts to resolve the IP address for the multilingual domain name by transmitting a binary value that represents the domain name (e.g., "C701 B1 B9.cc" based on the KSC 5601 encoding scheme) to an authoritative name server for the ".cc" TLD, but does not transmit the encoding system associated with the binary value.

When a MDN system working in conjunction with the authoritative name servers for the ".cc" TLD receives the domain name resolution request with the binary value, the system determines that the binary value corresponds to a multilingual domain name. The system then determines an appropriate MDN server that is able to process multilingual domain names, and returns an IP address of that MDN server to the user's browser. When the browser then uses that IP address to send an HTTP Request message for the URL to the MDN server, the server determines that the binary value domain name corresponds to the previously registered Korean domain name, and redirects the URL to another server that can provide an appropriate Web page for the requested URL. The Web browser may ultimately receive a response Web page 330, such as the example Web page illustrated in FIG. 3G. As previously indicated, the MDN server can determine the originally specified domain name or its binary value in various ways, such as from HTTP header fields that are part of the request for the URL, and could use that information to determine that the specified domain name corresponds to the IP address associated with the Korean multilingual domain name.

FIGS. 3H-3K illustrate example data structures that could be used by an embodiment of the MDN system. In particular, FIG. 3H illustrates an example domain name registry database that can hold domain names composed of characters within the DNS ASCII character subset, including ACE domain names that represent multilingual domain names. Each of the entries 340-352 in the database corresponds to a registered domain name, and includes the domain name and a variety of associated information such as the registrant of the domain. Other administrative information could also be stored for each registered domain name in this or another data structure.

Entries 348 and 350 illustrate examples of registered ACE domain names that represent multilingual domain names. In the illustrated embodiment, an ACE domain name is generated for a multilingual domain name that is being registered, with the generated ACE based on the binary value for the domain name and the associated encoding type. For example, the UTF-5 ACE illustrated in FIG. 3E for the Korean domain name 320 was "T55C QD6D" 324. Those skilled in the art will appreciate that a domain name formed directly from such as ACE, such as "t55cqd6d.cc" or "t55c-qd6d.cc" (capitalization is ignored in domain names), is unlikely to conflict with an existing or desired non-multilingual domain name, and thus could be used as a domain name registry entry that represents the Korean domain name. In the illustrated embodiment, to further reduce the chance of overlap with such non-multilingual domain names, the prefix "ra—" is added to each such ACE to form the representative ACE domain name in the domain name registry. Thus, the domain name registry entry 350 represents the Korean domain name. Those skilled in the art will appreciate that a variety of similar prefixes, suffixes, or other such modifications could similarly be used. In addition, in some embodiments all risk of overlap between multilingual domain name ACEs and non-multilingual domain names is removed by preventing non-multilingual domain names that begin with a prefix in use (i.e., "ra—" in the illustrated embodiment) from being registered.

FIG. 3I illustrates an example of a possible db.CC zone data file for a ".CC" zone that includes DNS resource records for domain names registered within the ".cc" TLD. Each of the resource records in the group 356 corresponds to a registered domain name that includes characters in the DNS ASCII character subset, and has the IP address of a Web server associated with the domain name. The last DNS resource record 358 in the file contains a wildcard expression "*" that matches any domain name that did not match an earlier entry in the file. Thus, this entry will match binary values sent by a Web browser for any multilingual domain name, as well as alphanumeric domain names that are not currently registered in the ".cc" TLD. In the illustrated embodiment, the IP address associated with the wildcard entry corresponds to an MDN server that can receive requests for URLs that include multilingual domain names and can determine how to respond in an appropriate manner.

Those skilled in the art will appreciate that in other embodiments different or no wildcards could be used, and that wildcards could be defined to match only some previously unmatched domain names. Similarly, multiple such wildcard entries that each match various subsets of domain names could be defined (e.g., based on regular expressions) and used.

The MDN server can determine how to respond to requests for URLs in a variety of ways, such as based on information included in the URL requests (e.g., in various HTTP header fields or in the URL.pathname) and/or based on user-specific or client-specific information. Such user-specific or client-specific information can include previously specified stored information (e.g., from a cookie that is located on the client device and is supplied along with the HTTP message), or preference information that the MDN server obtains by interactively querying the user or the client. In the illustrated embodiment, the MDN server receives a URL request, and determines the binary value associated with the included multilingual domain name from HTTP header fields such as the "HTTP_HOST" (or "HOST") header field. The MDN server then determines if the binary value is stored in a MDN Binary Variants database, such as the one illustrated in FIG. 3J.

Each entry in the example MDN Binary Variants database illustrated in FIG. 3J corresponds to a binary variant for a multilingual domain name. In particular, entries 370-385 are binary variants for the multilingual domain name whose ACE domain name is shown in entry 348 of the Registry database in FIG. 3H, and the value of field 364 for each of these entries correspondingly specifies that ACE domain name. Registry database entry 348 represents a Chinese language multilingual domain name of two characters encoded in the Big 5 encoding scheme, and FIG. 3L illustrates the visual representations of the Chinese domain name and of some of the binary variants.

As discussed previously, binary variants are generated during the registration process of such a multilingual domain name, and in the illustrated embodiment the registration is allowed to proceed only if none of the generated binary variants are already present in the Binary Variants database. There are multiple types of binary variants, and such binary variants to represent a multilingual domain name can be generated in a variety of ways. For example, variants can occur within the same character set encoding as the multilingual domain name, in other encodings for the same language (e.g., Big5 and GB2312 for Chinese), and in other languages. In addition, if software responsible for generating or transmitting the binary value for a multilingual domain name (e.g., the Web browser or client device operating system) makes mistakes of a consistent type, binary variants can be created to reflect such mistakes.

Binary variants within a single encoding are often the result of case-folding issues. For example, consider entry 370 in the Binary Variants database, which is the primary variant for entry 348 in the registry (as is shown in field 368). The binary value corresponds to a multilingual domain name encoded in Big 5, as noted in field 366. Of the eight hexadecimal values, the first four values (i.e., the first two bytes) represent a first Big 5 character and the second four values (i.e., the second two bytes) represent a second Big 5 character. The second byte of the second character is hexadecimal value 54 (also illustrated as "\x54"), which is the ASCII value of capital "T". Since at least some of the DNS-related software is case-insensitive (and may even translate upper-case letters to lower-case letters), however, a value of \x74 for this byte (i.e., the value of a lower-case "t") is treated the same as the illustrated binary value in the illustrated embodiment. Therefore, one binary variant for entry 370 is that shown in entry 375, which varies from that of the primary variant only in the \x54 in the final byte having been changed to a \x74.

Some characters exist in multiple languages and encodings, but the binary values for such characters in one encoding may differ from the binary value of the same characters in a different encoding. For example, the two characters in this Chinese domain name also exist in the Japanese Shift-JIS and EUC-JP character set encodings, but have different binary values in those encodings. In particular, the values of these characters are "93649075" in Shift-JIS and "c5c5bfd6" in EUC-JP, and in the illustrated embodiment these binary variants are represented in secondary entries 372 and 378 of the Binary Variants database. For such variants, the visual representations of the characters in the other encodings are the same, although the meaning of the two characters may differ in these other languages or encodings. Nonetheless, in the illustrated embodiment multilingual domain names of such characters in other languages and encodings will be prevented from being registered by entries such as 372 and 378.

In other encodings, completely different characters (including more or less characters) in other encodings may have associated binary values that are the same as the primary variant value "b971b054". If so, in the illustrated embodiment multilingual domain names with these characters will also be prevented from being registered by entry 370 of the Binary Variants database, despite the difference in visual appearance and meaning between these other characters and the two Chinese characters in the multilingual domain name that is being represented.

Figure 3P:
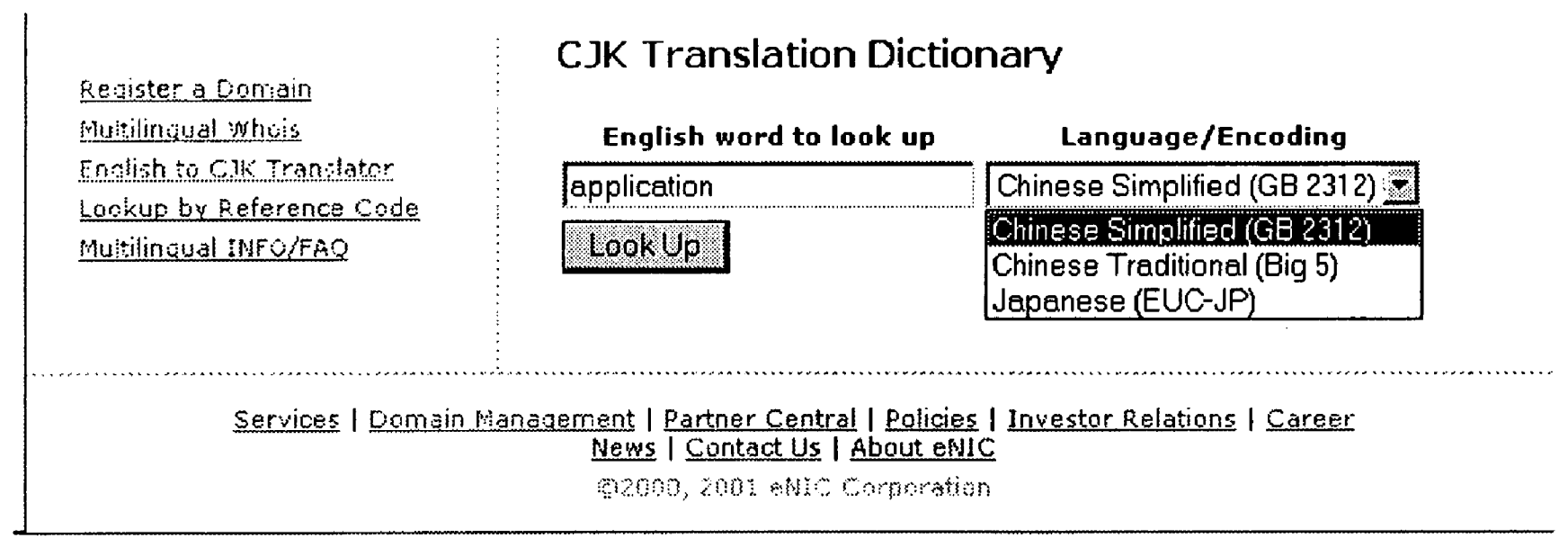

In the illustrated embodiment, the two Chinese characters for the multilingual domain name may represent a word (e.g., "cat"), and as noted these same two characters in other encodings such as Shift-JIS and EUC-JP may have other meanings. If so, some set of one or more other characters (that are likely to be visually distinct from the Chinese characters) in the Shift-JIS and EUC-JP encodings are likely to represent the same word in Japanese. In the illustrated embodiment, such other visually distinct but same-meaning (or similar-meaning) characters are not treated as variants of the Chinese multilingual domain name, but in other embodiments such characters could be variants and thus the binary values of the appropriate Japanese characters using the appropriate character F set encodings could be generated and also stored as variants. FIGS. 3P and 3Q illustrate example Web pages that provide one mechanism for identifying words in other encodings that have the same or related meanings to a specified word.

In addition, as noted previously, software responsible for generating or transmitting a multilingual domain name may mistakenly transmit the wrong binary values for characters in specified multilingual domain names. The entries in the Binary Variants database that have an encoding type that includes "Dumb UTF-8" represent binary variants for Web browsers that attempt to translate a multilingual domain name to UTF-8 but use the wrong encoding type when doing so. In addition, some browsers lower the case of capital letters before they are sent, and thus change the hexadecimal values sent (e.g., from \x54 to \x74).

Those skilled in the art will appreciate that in some embodiments only some of the types of illustrated binary variants may be generated and stored, while in other embodiments additional types of binary variants or no binary variants may be used. In addition, those skilled in the art will appreciate that the types of binary variants to generate can be determined in a variety of ways, such as based on system defaults, on user or client preferences, or on the willingness of a user to pay specified amounts to block specific types of variants from being registered. In addition, existing software is available that may generate some such binary variants, such as the previously discussed CCODE program.

As discussed above, the MDN server will determine if a binary domain name value in a received URL request is stored in the MDN Binary Variants database, and if so the MDN server will retrieve the corresponding representative ACE registered domain name. The MDN server then determines if resolution information is available for the retrieved ACE, such as by being present in a ACE Forwarding database such as the one illustrated in FIG. 3K. Each of the illustrated entries 394-396 correspond to an ACE, and each entry includes a variety of information associated with the ACE, including a corresponding URL or IP address in field 389. The MDN server determines the associated URL or IP address for the ACE that corresponds to the received binary domain name value, and redirects the URL request to the associated URL or IP address.

Those skilled in the art will also appreciate that in some embodiments the entries in the various databases could be combined in a single database. Similarly, those skilled in the art will appreciate that in some embodiments some of the illustrated types of information that are included in the databases may not be stored or may be stored in other associated data structures. Conversely, in other embodiments additional information may be included in these data structure or in other associated data structures. In addition, the information may be stored in other formats (e.g., in binary 0 s and 1 s rather than in hexadecimal, or without the "ra—" prefix), and ACEs may be generated in other ways.

Figure 4:
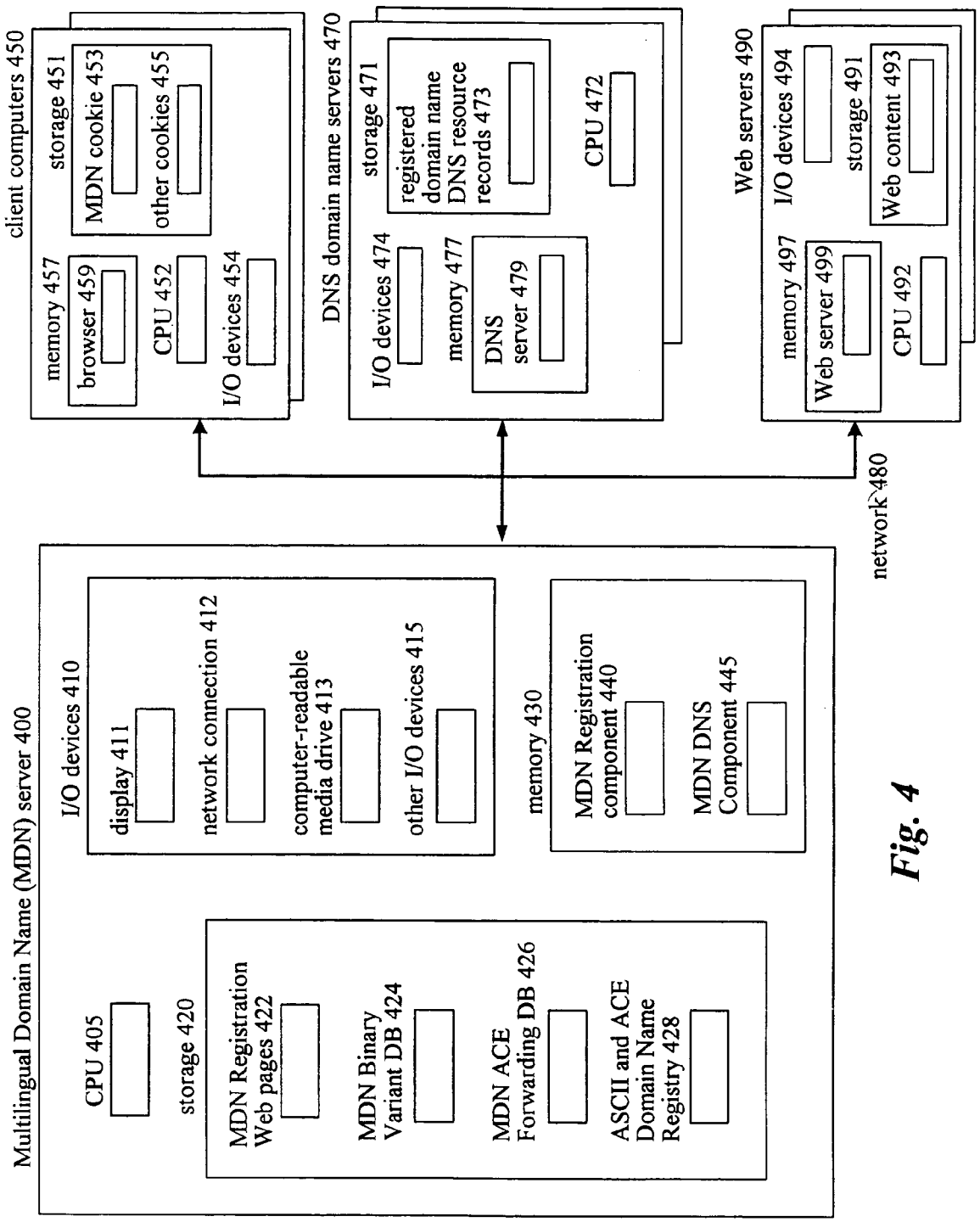
FIG. 4 is a block diagram illustrating an embodiment of the disclosed Multilingual Domain Name (MDN) system.

FIG. 4 illustrates an MDN server computer 400 that is suitable for executing an embodiment of the MDN Registration component 440 that registers multilingual domain names and an embodiment of the MDN DNS component 445 that receives URL requests that include multilingual domain names and provides an appropriate response. FIG. 4 also illustrates DNS domain name servers 470 suitable for providing DNS domain name resolution services for non-multilingual domain names, various Web servers 490 for providing Web content to clients, and various client computers 450 which can access the Web servers, domain name servers, and MDN server.

The client computers include storage 451 (e.g., a hard drive), a CPU 452, I/O devices 454, and memory 457. A Web browser 459 is executing in the memory, and Web browser cookies are present on the storage, including a cookie 453 containing information related to the MDN system and other cookies 455. In addition, the I/O devices include various input and output devices (not illustrated) with which a user (not illustrated) of the client can interact with the Web browser and with which the Web browser can present information to the user, such as a mouse and a display. For example, the user can interact with the Web browser to request and receive Web content (e.g., Web pages) from one or more of the Web servers 490; In addition, the user can interact with the MDN server to register multilingual domain names and request Web resources using URLs that include multilingual domain names.

The illustrated DNS domain name server 470 includes a CPU 472, various I/O devices 474, and a storage 471 that stores DNS resource records 473 (e.g., in a database or zone data files) for registered domain names that have characters from the DNS subset of ASCII characters. In the illustrated embodiment, at least one of the domain name servers also includes a wildcard entry that matches domain names without explicit resource records. A memory 477 includes executing DNS server software 479 that can receive domain name resolution requests and provide corresponding IP address information for the registered domain names. If the resolution request is for a domain name that is not registered (e.g., by indicating a binary value that corresponds to a multilingual domain name) and is to a domain name server having a wildcard entry, the wildcard entry will match the unregistered domain name and specify the IP address of an MDN server computer with a MDN DNS component 445 (e.g., MDN server 400).

The illustrated Web server 490 includes various Web content 493 that is stored on storage 491, a CPU 492, and various I/O devices 494. When Web server software 499 that is executing in memory 497 receives a request to provide some of the stored Web content (e.g., from a user of a client computer), the Web server can retrieve and send the requested content to the requester.

As noted, a user can interact with the MDN server to register multilingual domain names, and can request Web resources using URLs that include multilingual domain names. The illustrated MDN server 400 includes a CPU 405, various I/O devices 410 (including a display 411, a network connection 412, a computer-readable media drive 413, and other I/O devices 415), storage 420, and memory 430.

In order to register a multilingual domain name in the illustrated embodiment, the user requests an appropriate interactive registration Web page, such as one of the MDN Registration Web pages 422 stored on storage 420 of the MDN server. After the server supplies an appropriate page, the user can request to register a specified multilingual domain name, with the request sent to the MDN Registration component 440 executing in memory. The MDN Registration component then determines whether the specified multilingual domain name is already registered in the appropriate registry database (e.g., stored registry 428) and/or if a binary variant of the specified multilingual domain name is stored in the appropriate Binary Variants database (e.g., stored Binary Variants database 424). If not, the component adds an ACE version of the domain name to the registry database, stores the various binary variants for the domain name in the Binary Variants database, and stores the ACE and a corresponding URL in an ACE Forwarding database 426.

The user of the client can also interact with their Web browser to designate URL requests that include multilingual domain names. As noted, such URL requests are directed to the MDN server, and the MDN DNS component 445 receives such requests and provides appropriate Web resources. For example, when requests for URLs are received that include binary values for the domain name, the MDN DNS component can use the MDN Binary Variants database to determine an ACE corresponding to the binary value and can then redirect the URL request to the URL specified in the entry of the ACE Forwarding database for the corresponding ACE.

In some embodiments, some or all of the MDN components are operated by a registrar for a TLD, such as the ".cc" TLD. In particular, if such a registrar is a primary registrar for a TLD, then the registrar can control the DNS domain name server for that TLD, and can also control an MDN server associated with a wildcard entry in the registry database. This allows multilingual domain names to be both registered and used, such as in the described manner.

Those skilled in the art will appreciate that computer systems 400, 450, 470 and 490 are merely illustrative and are not intended to limit the scope of the present invention. The computer systems may be connected to other devices that are not illustrated, including through one or more networks such as the Internet or via the World Wide Web (WWW). In addition, the functionality provided by the illustrated MDN system components may in some embodiments be combined in fewer components or distributed in additional components. Similarly, in some embodiments the functionality of some of the illustrated components may not be provided and/or other additional functionality may be available. For example, while the illustrated MDN system includes both the MDN Registration Component and MDN DNS component, in other embodiments only one of the components may be present in a single computer and/or be controlled by a single entity.

Those skilled in the art will also appreciate that, while the various components of the MDN system are illustrated as being stored in memory while being used, these items or portions of them can be transferred between memory and other storage devices for purposes of memory management and data integrity. Similarly, while the various stored databases and other information are illustrated as being present on storage while being used, those skilled in the art will appreciate that these items, or portions of them, can instead be present in memory and transferred between storage and memory. The MDN components may also be stored as instructions on a computer-readable medium, such as a hard disk, a memory, a network, or a portable article to be read by an appropriate drive. Similarly, the data structures of the MDN system may also be stored on a computer-readable medium, such as the various databases. The MDN system instructions and data structures can also be transmitted as generated data signals (e.g., as part of a carrier wave) on a variety of computer-readable transmission mediums, including wireless-based and wired/cable-based mediums. Accordingly, the present invention may be practiced with other computer system configurations.

In some embodiments, a client system communicates with a server system in order to send HTTP requests and receive Web pages from the server over the Internet. One skilled in the art will appreciate, however, that the techniques of the MDN system can be used in various environments other than the Internet. Also, various communication channels may be used, such as a local area network, a wide area network, or a point-to-point dialup connection. In addition, a "client", "server" or "host" may comprise any combination of hardware or software that can interact, including computers, network devices, internet appliances, PDAs, wireless phones, pagers, electronic organizers, television-based systems and various other consumer products that include inter-communication capabilities. While Web pages are often constructed using HTML, other methods can be used to create such pages, such as Java, XML, HDML, WML, CGI scripts, etc. Similarly, communication protocols other than HTTP can be used, such as WAP, TCP/IP, or FTP, as well as a variety of inter-device communication mechanisms, including CDPD, CDMA, GSM, PDC, PHS, TDMA, FLEX, ReFLEX, iDEN, TETRA, DECT, DataTAC, Mobitex, etc. Both the client and the server system can also operate on a wide variety of operating system types (e.g., Windows, Linux, Unix, MacOS, BEOS, PalmOS, EPOC, Windows CE, FLEXOS, OS/9, JavaOS, etc.), and need not share the same operating system.

Figure 5:
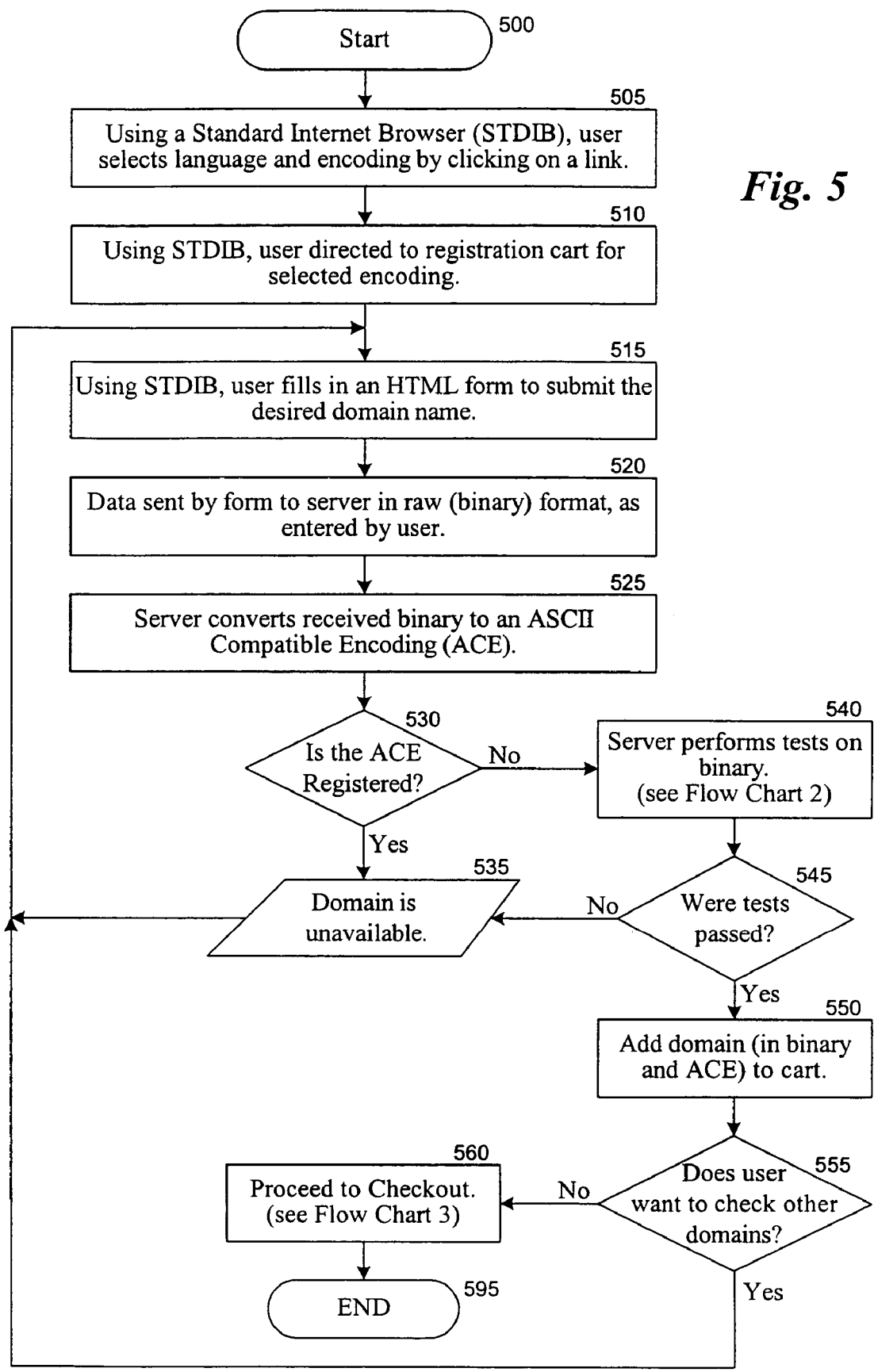
FIG. 5 is a flow diagram of an embodiment of the Multilingual Domain Name Registration routine.

FIG. 5 is a flow diagram of an embodiment of the Multilingual Domain Name Registration routine 500. The routine assists a user to specify a multilingual internationalized domain name whose registration is requested, determines whether the domain name is available to be registered, and if so registers the multilingual domain name. The routine begins in step 505, where a user is viewing an interactive domain name registration page from which the user can select a language and encoding to be used for a multilingual domain name that the user will specify. In step 510, the user is presented with a registration Web page for the selected encoding from which the user can add one or more multilingual domain names to a cart and then register those domain names by checking out the cart.

In step 515, the user specifies a multilingual domain name. In step 520, the user's Web browser transmits the specified multilingual domain name to the MDN system in binary form. The system also receives the specified encoding type from either the Web browser or from an indication of the type of registration Web page previously sent. In step 525, the system uses the specified encoding to convert the binary value to an ACE, and then continues to step 530 to determine if the ACE is present in the registry. If so, the routine continues to step 535 to indicate that the specified multilingual domain name is unavailable, and then returns to step 515. If the ACE was not in the registry, the routine continues to step 540 to execute a subroutine to generate binary variants for the specified multilingual domain name and to determine if any of the binary variants are already stored in a Binary Variants encoding table. If it is determined in step 545 that any of the binary variants are already stored, the routine continues to step 535.

If the ACE was not registered and none of the binary variants were stored, however, the routine continues to step 550 to add the specified multilingual domain name to a shopping cart for the user. The routine then continues to step 555 to determine if the user wants to register other domain names, and if so returns to step 515. If not, however, the routine continues to step 560 where a subroutine is executed to check-out the shopping cart, thus registering all specified multilingual domain names that are still available at the time of checkout. The routine then continues to step 595 and ends. Those skilled in the art will appreciate that in other embodiments no cart may be used, and thus a second check for availability at the time of checkout may not be needed. Alternatively, the system could reserve the specified domain names added to the cart for a temporary time so that others could not register them, and/or could suggest related alternative domain names when a domain name is not available.

Figure 6:
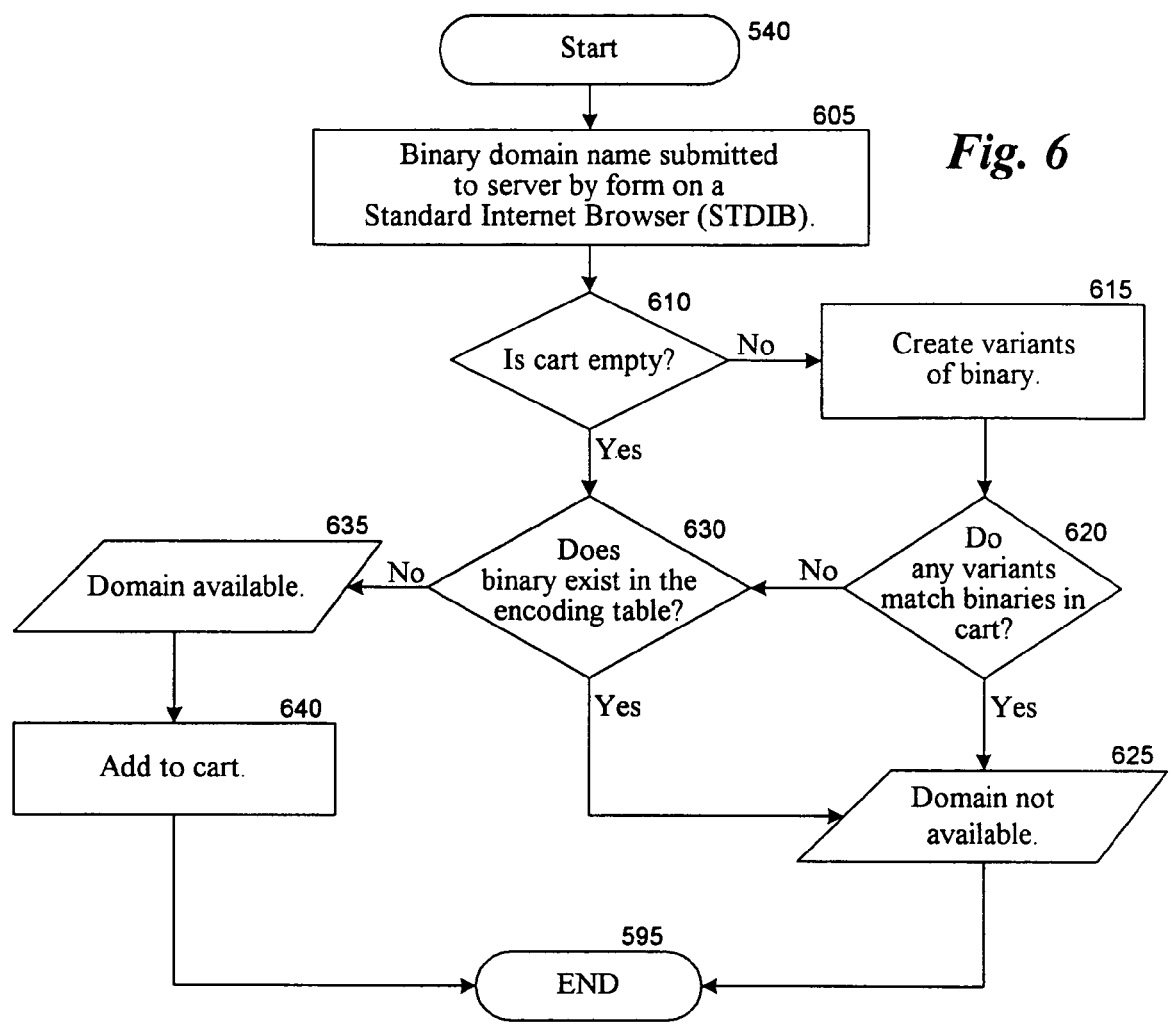
FIG. 6 is a flow diagram of an embodiment of the Check Domain Name Variants subroutine.

FIG. 6 is a flow diagram of an embodiment of the Check Domain Name Variants subroutine 540. The subroutine generates binary variants for a specified multilingual domain name, and determines if any of the variants are already stored for a previously registered domain name. The subroutine begins at step 605 where it receives an indication of the binary value for a specified multilingual domain name and of the encoding type associated with the domain name. In other embodiments, the multilingual domain name could be indicated in other ways, such as by directly indicating the ACE for the domain name (e.g., the ACE generated in step 525 of FIG. 5). After step 605, the subroutine continues to step 610 where it determines if the shopping cart is empty, and if so continues to step 630. If not, however, the subroutine continues to step 615 to generate binary variants for the specified domain name and to determine if the generated binary variants match any binary variants already in the cart. If so, the subroutine continues to step 625 to indicate to the user that the specified multilingual domain name is not available.

If none of the generated binary variants match any binary variants already in the cart, the subroutine continues to step 630 to determine if the binary value for the specified domain name is already stored in the Binary Variants encoding table. If so, the subroutine indicates to the user in step 625 that the domain name is not available, and if not the subroutine indicates to the user in step 635 that the domain name is available. After step 635, the subroutine adds the specified multilingual domain name to the user's shopping cart in step 640, and after steps 625 or 640 the subroutine ends. The multilingual domain names added to the shopping cart can also be represented in a variety of ways, such as with their corresponding ACE and/or one or more binary variants.

Figure 7:
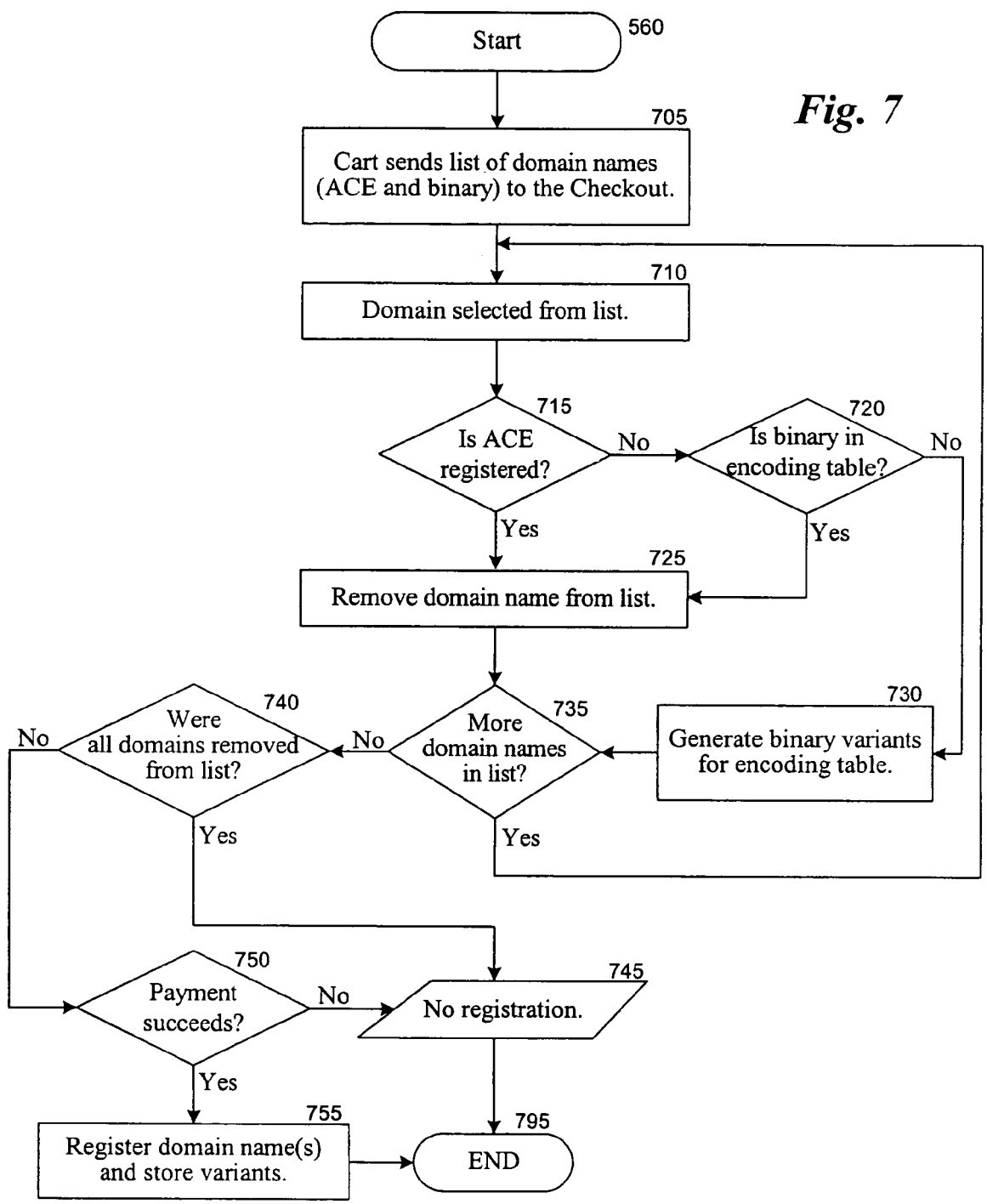
FIG. 7 is a flow diagram of an embodiment of the Register Domain Name and Reserve Variants subroutine.

FIG. 7 is a flow diagram of an embodiment of the Register Domain Name and Reserve Variants subroutine 560. The subroutine receives an indication of a user's shopping cart with one or more specified multilingual domain names, determines if the specified domain names are currently available to be registered, and if so registers ACEs for the domain names and stores binary variants for the domain names in a Binary Variants encoding database. The subroutine begins in step 705 where an indication is received of a cart to checkout that has one or more specified multilingual domain names, with each domain name represented in the illustrated embodiment by its ACE and its binary value. The subroutine continues to step 710 to select the next specified multilingual domain name from the cart, beginning with the first. In step 715, the subroutine determines if the ACE for the domain name is already present in the registry, and if so continues to step 725 to remove the domain name from the cart. If not, however, the subroutine continues to step 720 to determine if the binary value is stored in the Binary Variants encoding database, and if so continues to step 725. If not, however, the subroutine continues to step 730 to generate and store binary variants for the specified domain name. After steps 725 or 730, the subroutine continues to step 735 to determine if there are more specified domain names in the cart, and if so returns to step 710.

If there are no more specified domain names, the subroutine continues to step 740 to determine if all the domain names were removed from the cart, and if so continues to step 745 to indicate that the domain name registration failed. If there is at least one domain name in the cart, however, the subroutine continues to step 750 to determine if the payment method for the user is successful, and if not continues to step 745. If payment is successful, however, the subroutine continues to step 755 to, for each of the remaining domain names, register the ACE version of the domain name in the registry, store the generated binary variants in the Binary Variants encoding database, and store the ACE and corresponding forwarding information in the ACE Forwarding database. After steps 745 or 755, the subroutine continues to step 795 and ends.

Figure 8:
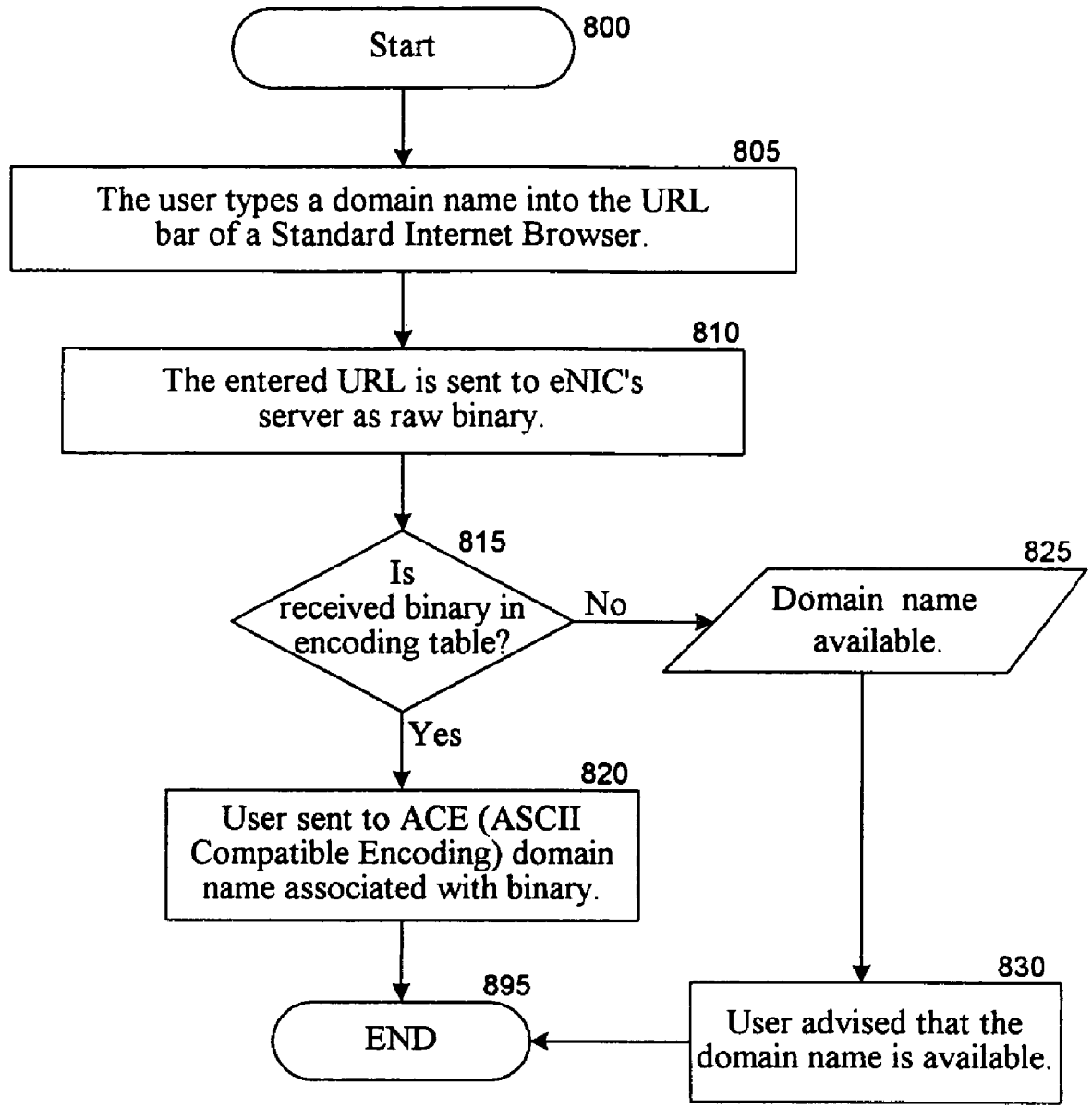
FIG. 8 is a flow diagram of an embodiment of the Retrieve IP Address For Multilingual Domain Name routine.

FIG. 8 is a flow diagram of an embodiment of the Retrieve IP Address For Multilingual Domain Name routine 800. The routine in the illustrated embodiment receives the binary value for a specified multilingual domain name (but not the encoding type of the domain name), determines if the domain name is registered, and if so returns an associated IP address to be used in place of the domain name. The routine begins in step 805 where the user specifies a multilingual domain name (e.g., a URL that includes the multilingual domain name). In step 810, the binary version of the multilingual domain name is sent to an appropriate authoritative DNS name server controlled by the system. The routine then continues to step 815 where the routine checks if the received binary value is stored in the Binary Variants encoding database, and if so continues to step 820. In step 820, the routine determines the ACE associated with the binary value in the Binary Variants encoding database, determines a URL associated with the ACE in the ACE Forwarding database, and provides the Web resource associated with the determined URL. In alternative embodiments, the routine could instead redirect the request to an appropriate Web server that could provide the appropriate Web resource. If the binary value was not stored in the Binary Variants encoding database, however, the routine instead continues to step 825 to determine that the specified domain name is not registered, and in the illustrated embodiment indicates to the user in step 830 that the specified domain name is available to be registered. After steps 820 or 830, the routine continues to step 895 and ends.

Those skilled in the art will appreciate that payment could additionally be charged by the MDN system for a variety of actions other than registering a specified multilingual domain name, such as based on the number or type of additional binary variants that will be reserved.

Those skilled in the art will also appreciate that in some embodiments the functionality provided by the routines discussed above may be provided in alternative ways, such as being split among more routines or consolidated into less routines. Similarly, in some embodiments illustrated routines may provide more or less functionality than is described, such as when other illustrated routines instead lack or include such functionality respectively, or when the amount of functionality that is provided is altered. In addition, those skilled in the art will appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims.

What is claimed is:

1. A computer-implemented method for registering multilingual domain names that include non-ASCII characters, the method comprising:

providing a Web page including a field in which a user can specify a second-level domain name portion including non-ASCII characters using a non-ASCII character set, the non-ASCII character set being specified by an encoding selected by the user from among a plurality of encodings presented by the Web page;

receiving a request to register a multilingual domain name in a top-level domain (TLD), the multilingual domain name having the specified second-level domain name portion including non-ASCII characters, each character in the specified character set having an associated numeric value, the second-level domain name portion indicated in the received request by a sequence of the numeric values that are derived from the non-ASCII characters of the second-level domain name portion;

generating an ASCII-Compatible Encoding (ACE) for the specified second-level domain name portion based on the specified character set and the indicated numeric sequence for the second-level domain name portion;

constructing an ASCII domain name whose second-level domain name portion is the generated ACE and whose top-level domain name portion is the TLD;

determining whether the constructed ASCII domain name is available to be registered in the TLD and whether the indicated numeric sequence has already been reserved for another multilingual domain name registered in the TLD, wherein determining whether the indicated numeric sequence has already been reserved includes:

searching for the indicated numeric sequence throughout at least one database that includes multilingual domain names for a plurality of non-ASCII character sets; and determining that the indicated numeric sequence has already been reserved when the indicated numeric sequence appears as a reserved multilingual domain name anywhere in the database; and when it is determined that the constructed ASCII domain name is available to be registered and that the indicated numeric sequence has not been reserved, registering the multilingual domain name in the TLD, the registering including:
generating multiple distinct numeric sequence variants as equivalents for the specified second-level domain name portion of the multilingual domain name, each generated numeric sequence variant consisting of a sequence of numeric values;
reserving the generated numeric sequence variants for the multilingual domain name;
presenting a plurality of the variants to the user;
receiving a selection of one or more of the plurality of variants presented to the user; and
registering a domain name in the TLD corresponding to each of the one or more variants selected by the user.

2. The method of claim 1 including preventing registration of the multilingual domain name in the TLD when it is determined that the ASCII domain name is not available to be registered in the TLD and/or that the indicated numeric sequence has already been reserved.

3. The method of claim 1 wherein the generating of the numeric sequence variants is performed before the registering of the multilingual domain name, and wherein the registering of the multilingual domain name is performed only if it is further determined that none of the generated numeric sequence variants has already been reserved.

4. The method of claim 1 wherein the generated numeric sequence variants include the indicated numeric sequence.

5. The method of claim 1 including, after the multilingual domain name is registered in the TLD:
receiving a request to register in the TLD a second multilingual domain name that is distinct from the multilingual domain name, the second multilingual domain name having a second-level domain name portion that is indicated in the received request by a second sequence of numeric values associated with characters of the second-level domain name portion;
determining that the indicated second sequence of numeric values is one of the
generated numeric sequence variants for the multilingual domain name; and
indicating that the second multilingual domain name is not available to be registered based on the determining.

6. The method of claim 1 wherein the registering of the multilingual domain name in the TLD includes registering the ASC11 domain name in the TLD.

7. The method of claim 1 wherein the registering of the multilingual domain name in the TLD includes associating an IP address and/or a URL with the ASC11 domain name and/or with the reserved numeric sequence variants.

8. The method of claim 1 wherein the registering of the multilingual domain name in the TLD includes associating the multilingual domain name with a server computer system able to receive requests that specify the multilingual domain name and to respond in an appropriate manner.

9. The method of claim 1 wherein each of multiple distinct character sets are associated with one or more encoding systems that each assign a numeric value that is unique within that encoding system to each character in that associated set, and wherein the numeric values that are associated with the non-ASCII characters of the second-level domain name portion of the multilingual domain name are the unique numeric values assigned to those characters by an encoding system associated with the specified character set.

10. The method of claim 1, wherein registering the multilingual domain name in the TLD further includes:
adding a prefix and/or a suffix to the generated ACE to create a new second-level domain name for the ASCII domain corresponding to the multilingual domain name.

11. The method of claim 10, wherein a prefix is added and the prefix is a sequence of characters followed by two dashes.

12. The method of claim 11, wherein the prefix is "ra—".

13. The method of claim 1 wherein the generating of the numeric sequence variants includes determining a mistake made in selecting some or all of the values that are included in the indicated numeric sequence to reflect an association with the non-ASCII characters of the second-level domain name portion, and including generating one or more numeric sequences that vary from the indicated numeric sequence in such a manner as to correct the determined mistake.

14. The method of claim 1, wherein the non-ASCII characters with which the user can specify the second-level domain name portion correspond to characters in the encoding selected by the user.

15. The method of claim 1, wherein the request includes an indication of the encoding selected by the user.

16. A non-transitory computer readable storage medium encoded with a plurality of instructions for controlling a processor to perform an operation for registering multilingual domain names that include non-ASCII characters, the instructions comprising:
providing a Web page including a field in which a user can specify a second-level domain name portion including non-ASCII characters using a non-ASCII character set, the non-ASCII character set being specified by an encoding selected by the user from among a plurality of encodings presented by the Web page;
receiving a request to register a multilingual domain name in a top-level domain (TLD), the multilingual domain name having the specified second-level domain name portion including non-ASCII characters, each character in the specified character set having an associated numeric value, the second-level domain name portion indicated in the received request by a sequence of the numeric values that are derived from the non-ASCII characters of the second-level domain name portion;
generating an ASCII-Compatible Encoding (ACE) for the specified second-level domain name portion based on the specified character set and the indicated numeric sequence for the second-level domain name portion;
constructing an ASCII domain name whose second-level domain name portion is the generated ACE and whose top-level domain name portion is the TLD;
determining whether the constructed ASCII domain name is available to be registered in the TLD and whether the indicated numeric sequence has already been reserved for another multilingual domain name registered in the TLD, wherein determining whether the indicated numeric sequence has already been reserved includes:
searching for the indicated numeric sequence throughout at least one database that includes multilingual domain names for a plurality of non-ASCII character sets; and
determining that the indicated numeric sequence has already been reserved when the indicated numeric sequence appears as a reserved multilingual domain name anywhere in the database; and
when it is determined that the constructed ASCII domain name is available to be registered and that the indicated numeric sequence has not been reserved, registering the multilingual domain name in the TLD, the registering including:
  generating multiple distinct numeric sequence variants as equivalents for the specified second-level domain name portion of the multilingual domain name, each generated numeric sequence variant consisting of a sequence of numeric values;
  reserving the generated numeric sequence variants for the multilingual domain name;
  presenting a plurality of the variants to the user;
  receiving a selection of one or more of the plurality of variants presented to the user; and
  registering a domain name in the TLD corresponding to each of the one or more variants selected by the user.

17. The computer readable storage medium of claim 16, wherein the instructions further comprise preventing registration of the multilingual domain name in the TLD when it is determined that the ASCII domain name is not available to be registered in the TLD and/or that the indicated numeric sequence has already been reserved.

18. The computer readable storage medium of claim 16, wherein the generating of the numeric sequence variants is performed before the registering of the multilingual domain name, and wherein the registering of the multilingual domain name is performed only if it is further determined that none of the generated numeric sequence variants has already been reserved.

19. The computer readable storage medium of claim 16, wherein the generated numeric sequence variants include the indicated numeric sequence.

20. The computer readable storage medium of claim 16, wherein the instructions further comprise, after the multilingual domain name is registered in the TLD:
  receiving a request to register in the TLD a second multilingual domain name that is distinct from the multilingual domain name, the second multilingual domain name having a second-level domain name portion that is indicated in the received request by a second sequence of numeric values associated with characters of the second-level domain name portion;
  determining that the indicated second sequence of numeric values is one of the generated numeric sequence variants for the multilingual domain name; and
  indicating that the second multilingual domain name is not available to be registered based on the determining.

21. The computer readable storage medium of claim 16, wherein the registering of the multilingual domain name in the TLD includes associating the multilingual domain name with a server computer system able to receive requests that specify the multilingual domain name and to respond in an appropriate manner.

22. The computer readable storage medium of claim 16, wherein each of multiple distinct character sets are associated with one or more encoding systems that each assign a numeric value that is unique within that encoding system to each character in that associated set, and wherein the numeric values that are associated with the non-ASCII characters of the second-level domain name portion of the multilingual domain name are the unique numeric values assigned to those characters by an encoding system associated with the specified character set.

23. The computer readable storage medium of claim 16, wherein registering the multilingual domain name in the TLD further includes:
  adding a prefix and/or a suffix to the generated ACE to create a new second-level domain name for the ASCII domain corresponding to the multilingual domain name.

24. The computer readable storage medium of claim 16, wherein the generating of the numeric sequence variants includes determining a mistake made in selecting some or all of the values that are included in the indicated numeric sequence to reflect an association with the non-ASCII characters of the second-level domain name portion, and including generating one or more numeric sequences that vary from the indicated numeric sequence in such a manner as to correct the determined mistake.

25. The computer-readable storage medium of claim 16, wherein the non-ASCII characters with which the user can specify the second-level domain name portion correspond to characters in the encoding selected by the user.

26. The computer-readable storage medium of claim 16, wherein the request includes an indication of the encoding selected by the user.

27. A system comprising:
  a processor;
  a computer-readable storage medium storing a plurality of instructions that cause the processor to:
  provide a Web page including a field in which a user can specify a second-level domain name portion including non-ASCII characters using a non-ASCII character set, the non-ASCII character set being specified by an encoding selected by the user from among a plurality of encodings presented by the Web page;
  receive a request to register a multilingual domain name in a top-level domain (TLD), the multilingual domain name having a the specified second-level domain name portion including non-ASCII characters, each character in the specified character set having an associated numeric value, the second-level domain name portion indicated in the received request by a sequence of the numeric values that are derived from the non-ASCII characters of the second-level domain name portion;
  generate an ASCII-Compatible Encoding (ACE) for the specified second-level domain name portion based on the specified character set and the indicated numeric sequence for the second-level domain name portion;
  construct an ASCII domain name whose second-level domain name portion is the generated ACE and whose top-level domain name portion is the TLD;
  determine whether the constructed ASCII domain name is available to be registered in the TLD and whether the indicated numeric sequence has already been reserved for another multilingual domain name registered in the TLD, wherein determining whether the indicated numeric sequence has already been reserved includes:
    searching for the indicated numeric sequence throughout at least one database that includes multilingual domain names for a plurality of non-ASCII character sets; and
    determining that the indicated numeric sequence has already been reserved when the indicated numeric sequence appears as a reserved multilingual domain name anywhere in the database; and
  when it is determined that the constructed ASCII domain name is available to be registered and that the indicated numeric sequence has not been reserved, register the multilingual domain name in the TLD, the registering including:
    generating multiple distinct numeric sequence variants as equivalents for the specified second-level domain name portion of the multilingual domain name, each generated numeric sequence variant consisting of a sequence of numeric values;

reserving the generated numeric sequence variants for the multilingual domain name;

presenting a plurality of the variants to the user;

receiving a selection of one or more of the plurality of variants presented to the user; and registering a domain name in the TLD corresponding to each of the one or more variants selected by the user.

28. The system of claim 27, the processor further configured to prevent registration of the multilingual domain name in the TLD when it is determined that the ASCII domain name is not available to be registered in the TLD and/or that the indicated numeric sequence has already been reserved.

29. The system of claim 27 wherein the processor is configured to generate the numeric sequence variants before registering the multilingual domain name, and further configured to register the multilingual domain name only if it is further determined that none of the generated numeric sequence variants has already been reserved.

30. The system of claim 27 wherein the generated numeric sequence variants include the indicated numeric sequence.

31. The system of claim 27 including, the processor further configured to, after the multilingual domain name is registered in the TLD:

receive a request to register in the TLD a second multilingual domain name that is distinct from the multilingual domain name, the second multilingual domain name having a second-level domain name portion that is indicated in the received request by a second sequence of numeric values associated with characters of the second-level domain name portion;

determine that the indicated second sequence of numeric values is one of the generate numeric sequence variants for the multilingual domain name; and indicate that the second multilingual domain name is not available to be registered based on the determining.

32. The system of claim 27 wherein registering of the multilingual domain name in the TLD includes registering the ASCII domain name in the TLD.

33. The system of claim 27 wherein registering the multilingual domain name in the TLD includes associating an IP address and/or a URL with the ASCII domain name and/or with the reserved numeric sequence variants.

34. The system of claim 27 wherein registering the multilingual domain name in the TLD includes associating the multilingual domain name with a server computer system able to receive requests that specify the multilingual domain name and to respond in an appropriate manner.

35. The system of claim 27 wherein each of multiple distinct character sets are associated with one or more encoding systems that each assign a numeric value that is unique within that encoding system to each character in that associated set, and wherein the numeric values that are associated with the non-ASCII characters of the second-level domain name portion of the multilingual domain name are the unique numeric values assigned to those characters by an encoding system associated with the specified character set.

36. The system of claim 27, wherein registering the multilingual domain name in the TLD includes:

adding a prefix and/or a suffix to the generated ACE to create a new second-level domain name for the ASCII domain corresponding to the multilingual domain name.

37. The system of claim 36, wherein a prefix is added and the prefix is a sequence of characters followed by two dashes.

38. The system of claim 36, wherein the prefix is "ra—".

39. The system of claim 27 wherein generating the numeric sequence variants includes determining a mistake made in selecting some or all of the values that are included in the indicated numeric sequence to reflect an association with the non-ASCII characters of the second-level domain name portion, and including generating one or more numeric sequences that vary from the indicated numeric sequence in such a manner as to correct the determined mistake.

40. The system of claim 27, wherein the non-ASCII characters with which the user can specify the second-level domain name portion correspond to characters in the encoding selected by the user.

41. The system of claim 27, wherein the request includes an indication of the encoding selected by the user.

* * * * *